US012453704B2

(12) United States Patent
Morinaga et al.

(10) Patent No.: US 12,453,704 B2
(45) Date of Patent: Oct. 28, 2025

(54) METHOD FOR PRODUCING PARTICLES

(71) Applicants: Tadahiko Morinaga, Kanagawa (JP); Tatsuru Moritani, Kanagawa (JP)

(72) Inventors: Tadahiko Morinaga, Kanagawa (JP); Tatsuru Moritani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 514 days.

(21) Appl. No.: 17/906,326

(22) PCT Filed: Mar. 11, 2021

(86) PCT No.: PCT/JP2021/009698
§ 371 (c)(1),
(2) Date: Sep. 14, 2022

(87) PCT Pub. No.: WO2021/187289
PCT Pub. Date: Sep. 23, 2021

(65) Prior Publication Data
US 2023/0106801 A1     Apr. 6, 2023

(30) Foreign Application Priority Data

Mar. 16, 2020   (JP) ................................ 2020-045858

(51) Int. Cl.
*A61K 9/50*      (2006.01)
*A61K 9/48*      (2006.01)
*C07K 16/42*     (2006.01)

(52) U.S. Cl.
CPC .......... *A61K 9/5031* (2013.01); *A61K 9/4858* (2013.01); *A61K 9/5089* (2013.01); *C07K 16/4241* (2013.01)

(58) Field of Classification Search
CPC .. A61K 9/5031; A61K 9/5089; A61K 9/4858; C07K 16/4241
See application file for complete search history.

(56) References Cited

U.S. PATENT DOCUMENTS

| 6,113,943 | A  | * | 9/2000 | Okada ................. | A61K 9/1647 514/963 |
| 2005/0214330 | A1 | * | 9/2005 | Yamamoto .......... | A61K 9/1647 514/10.3 |
| 2009/0317735 | A1 |   | 12/2009 | Ohtani et al. | |
| 2017/0266119 | A1 |   | 9/2017 | Deng et al. | |
| 2017/0354592 | A1 |   | 12/2017 | Ivanova et al. | |
| 2018/0256480 | A1 |   | 9/2018 | Deng et al. | |
| 2019/0076361 | A1 |   | 3/2019 | Onque et al. | |
| 2019/0247314 | A1 |   | 8/2019 | Shiraishi et al. | |
| 2019/0292333 | A1 |   | 9/2019 | Moritani et al. | |
| 2019/0302633 | A1 |   | 10/2019 | Morinaga et al. | |
| 2022/0409539 | A1 | * | 12/2022 | Gala .................... | A61K 39/39 |

FOREIGN PATENT DOCUMENTS

| JP | H10-182496 | 7/1998 |
| JP | H10-511957 | 11/1998 |
| JP | 2004-083575 | 3/2004 |
| JP | 2007-199463 | 8/2007 |
| JP | 2008-292976 | 12/2008 |
| JP | 4647506 | 3/2011 |
| JP | 2017-160188 | 9/2017 |
| JP | 2019-137670 | 8/2019 |
| JP | 2019-521979 | 8/2019 |
| JP | 2019-177371 | 10/2019 |
| WO | 96/20698 | 7/1996 |
| WO | WO2015/172149 A1 | 11/2015 |
| WO | WO2016/183209 A1 | 11/2016 |

OTHER PUBLICATIONS

Friedrich, et al. "Development and physicochemical characterization of dexamethasone-loaded polymeric nanocapsule suspensions" 2008. Quim. Nova, 31(5), 1131-1136. (Year: 2008).*
Arrighi, et al. "Development of PLGA microparticles with high immunoglobin G-loaded levels and sustained-release properties obtained by spray-drying a water-in-oil emulsion" 2019. International Journal of Pharmaceutics. 566 291-298. (Year: 2019).*
International Search Report Issued May 27, 2021 for counterpart International Patent Application No. PCT/JP2021/009698 filed Mar. 11, 2021.
International Journal of Pharmaceutics 566 (2019) 291-298, Arrighi et al.
Japanese Office Action dated Oct. 3, 2023, in Japanese Patent Application No. 2020-045858, 2 pages.
Japanese Office Action dated Feb. 13, 2024, in Japanese Application No. 2020-045858, 2 pages.

* cited by examiner

*Primary Examiner* — Frederick F Krass
*Assistant Examiner* — Toriana N. Vigil
(74) *Attorney, Agent, or Firm* — Grüneberg and Myers PLLC

(57) ABSTRACT

Provided is a method for producing particles including: preparing a dispersion liquid with Liquid A and Liquid B, where Liquid A is a solution containing a physiologically active substance, and Liquid B is a solution containing a base material and a surfactant; and forming particles from the dispersion liquid.

4 Claims, 2 Drawing Sheets

METHOD FOR PRODUCING PARTICLES

CROSS-REFERENCE TO RELATED APPLICATIONS

This application is the National Stage entry under § 371 of International Application No. PCT/JP2021/009698, filed on Mar. 11, 2021, and which claims the benefit of priority to Japanese Application No. 2020-045858, filed on Mar. 16, 2020. The content of each of these applications is hereby incorporated by reference in its entirety.

BACKGROUND OF THE INVENTION

Technical Field

The present disclosure relates to a method for producing particles.

BACKGROUND ART

In recent years, researches on polymer compounds having bioactivity, so-called biopharmaceuticals, have been actively performed, and the researches go into not only the field of drug discovery, but also the formulation field. In the formulation field, there has been an attempt to impart a new function to a pharmaceutical compound by integrating a polymer compound having bioactivity (may be referred to as a physiologically active substance hereinafter) with a functional base material.

Examples of a method for integrating the physiologically active substance and the functional base material include liquid drying and spray drying. One example of the liquid drying is a method where an aqueous phase in which a physiologically active substance is dissolved is dispersed in an oil phase in which an organic base material (functional base material) is dissolved to prepare a W/O emulsion, the W/O emulsion is then dispersed in an aqueous phase to prepare a W/O/W emulsion, and the solvents therein are removed and dried to thereby obtain particles. Moreover, an example of the spray drying is a method where a liquid including a base material and a physiologically active substance is sprayed, and the sprayed droplets are heated and dried to thereby produce particles.

For example, reported is a method where a solution in which IgG antibodies are included in PLGA using a W/O emulsion is spray-dried to thereby produce particles (see, for example, NPL 1).

CITATION LIST

Patent Literature

NPL 1: International Journal of Pharmaceutics 566 (2019) 291-298, Arrighi et al.

SUMMARY OF INVENTION

Technical Problem

The present disclosure has an object to provide a method for producing particles, where the method can obtain particles which include a high concentration of a polymer compound with maintaining bioactivity thereof, and achieve excellent sustained-release.

Solution to Problem

According to one aspect of the present disclosure, a method for producing particles includes preparing a dispersion liquid with Liquid A and Liquid B, where Liquid A is a solution containing a physiologically active substance, and Liquid B is a solution containing a base material and a surfactant, and forming particles from the dispersion liquid.

Advantageous Effects of Invention

The present disclosure can provide a method for producing particles, where the method can obtain particles which include a high concentration of a polymer compound with maintaining bioactivity thereof, and achieve excellent sustained-release.

DESCRIPTION OF EMBODIMENTS

Figure 1:
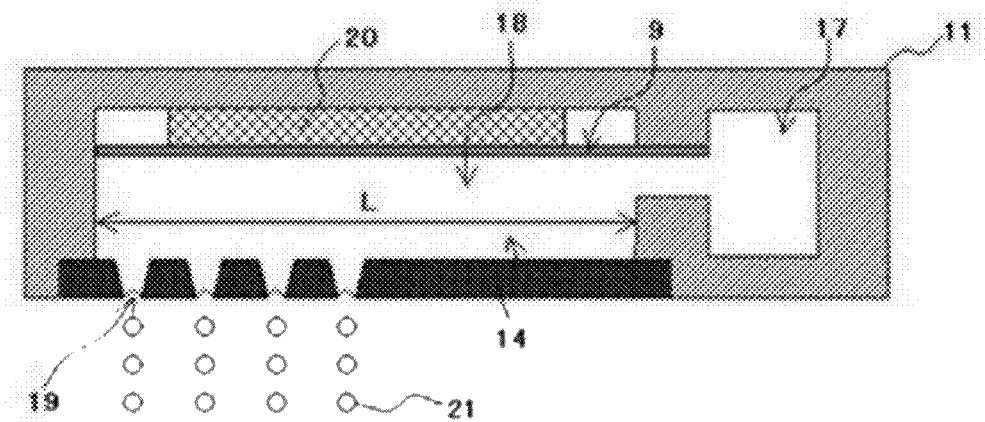
FIG. 1 is a schematic cross-sectional view illustrating one example of a liquid column resonance droplet-ejecting unit.

The present inventors have studied on a method for producing particles, which can produce particles having excellent sustained releasability with maintaining bioactivity of a polymer compound included at a high concentration. As a result, the present inventors obtained the following insights.

In the related art, a surfactant is dissolved in an "aqueous phase" including a physiologically active substance, and stability of particles (improvement of sustained releasability) with the surfactant has not been studied. In the related art, moreover, stability of IgG antibodies (physiologically active substance) within generated particles, i.e., retention of bioactivity of the physiologically active substance included in the particles, has not been studied.

The method for producing particles of the present disclosure is based on the insights that particles having excellent sustained releasability of a polymer compound (physiologically active substance) with maintaining bioactivity of the polymer compound included at a high concentration can be obtained by forming a dispersion liquid from Liquid A including the physiologically active substance and Liquid B including a base material and a surfactant, and forming particles from the dispersion liquid.

In the present specification, the term "particle(s)" may be also referred to as "microcapsule(s)" or "microparticle(s)."

(Particles)

In the present specification, the term "particles" means a group of a granular composition including the base material and the physiologically active substance, unless otherwise stated.

The particles of the present disclosure are typically functional particles exhibiting a desired function. The particles of the present disclosure are designed to be functional particles having a desired function by appropriately selecting the base material to be included.

Examples of the functional particles include: particles that deliver a physiologically active substance to a target site to exhibit a desired physiological effect, i.e., particles used in a drug delivery system (DDS particles); sustained-release particles that gradually release a drug over a long-period of time; and solubilized particles for solubilizing a poorly soluble physiologically active substance.

Next, embodiments of particles will be described. Generally, embodiments of the particles each including the base material and the physiologically active substance include capsule particles, which are an embodiment where the physiologically active substance is encapsulated in the base material, carrier particles, in which the physiologically active substance is carried on a surface of each particle of the base material, and particles of other embodiments.

Examples of the capsule particles include dispersion capsule particles, and maldistribution capsule particles.

The dispersion capsule particles are not particularly limited as long as the physiologically active substance is dispersed and included in the base material. The physiologically active substance may not be uniformly dispersed in the base material.

When each particle includes a plurality of base materials and one of the base materials is locally arranged in the predetermined area of the particle, moreover, the dispersion degree of the physiologically active substance may vary depending on the type of the base material in which the physiologically active substance is dispersed.

Examples of the dispersion capsule particles include the particles of the present disclosure, and particles produced by the emulsion method.

The maldistribution capsule particles are particles, in each of which the physiologically active substance is unevenly distributed and included in the base material. In other words, it is an embodiment where the physiologically active substance is included in the base material by arranging the physiologically active substance to be substantially separated from the base material within each particle.

Examples of an embodiment of the maldistribution capsule particles include an embodiment of a particle where the physiologically active substance constitutes a core, and the base material constitutes a shell covering the core. Examples of the maldistribution capsule particles include liposomes, micelles, and coated particles.

The carrier particles are an embodiment where the physiologically active substance is adsorbed on or bonded to a surface of the base material.

Examples of the adsorption include chemical adsorption and physical adsorption.

Examples of the bond include a hydrogen bond, a covalent bond, an ionic bond, and a chelate bond.

Examples of particles used as the carrier particles include porous particles, where, for example, a physiologically active substance carried on a surface of a porous base material (including not only external surfaces, but also internal surfaces) in the form of particles.

The particles of the present disclosure are classified as capsule particles because the physiologically active substance is included and dispersed in at least one base material. Moreover, the particles are classified as dispersion-inclusion particles, particularly below-described solid dispersion particles.

Moreover, the particles of the present disclosure may include two or more base materials. When the particles include two or more base materials, one base material may be included and locally arranged at the surface side of each particle. In this case, the physiologically active substance is included and dispersed in both the base material included and locally arranged at the surface side of each particle (may be referred to as a "surface base material" hereinafter), and the base material(s) other than the surface base material (may be referred to as an "inner base material"), even though there may be a difference in the degree of dispersion.

Specific examples of such embodiment include: an embodiment where the physiologically active substance is included more in the surface base material; and an embodiment where the physiologically active substance is included more in the inner base material. Among the above-listed example, the embodiment where the physiologically active substance is included more in the inner base material is preferable. Since the physiologically active substance is included more in the inner base material, the sustained-release particles, where the dissolution speed of the physiologically active substance is controlled, can be produced.

A method for confirming the embodiment where the particles include two or more base materials, and one of the two or more base materials is included and locally arranged at the surface side of each particle is not particularly limited and may be appropriately selected depending on the intended purpose.

One example of the confirmation method is a method where cross-sections of the particles are observed by a scanning electron microscope, a transmission electron microscope, or a scanning probe microscope.

Moreover, another example of the confirmation method is a method where components of the base material in the inner area of a particle and components of the base material at a surface of the particle are measured by time-of-flight secondary ion mass spectrometry, and the measured particle is confirmed as the particles of the present disclosure if the measured components of the base material in the inner area and the measured components of the base material at the surface of the particle can be judged as being different from each other.

As another confirmation method, moreover, a pre-treatment, such as electron staining and a dissolution treatment, can be performed. In the case where the particles each include a base material of a water-soluble component, and a base material of a water-insoluble component, for example, the cross-sections of the particles are immersed in water, and the cross-sections of the particles from which the water-soluble component is completely dissolved is observed by a scanning electron microscope to judge the remaining part of the cross-section of each particle as the water-insoluble component, and the void as the water-soluble component, to thereby confirm the particles.

(Method for Producing Particles)

The method for producing particles of the present disclosure includes a preparing step, and a granulating step. The preparing step includes preparing a dispersion liquid with Liquid A and Liquid B, where Liquid A is a solution containing a physiologically active substance, and Liquid B is a solution containing a base material and a surfactant. The granulating step includes forming particles from the dispersion liquid. The method may further include other steps according to the necessity.

In the method for producing particles of the present disclosure, Liquid A, in which the physiologically active substance is dissolved in Solvent A, and Liquid B, in which the base material and the surfactant are dissolved in Solvent B, are mixed and stirred to prepare a W/O emulsion where Liquid A is present within Liquid B.

A solvent of Liquid A (Solvent A) and a solvent of Liquid B (Solvent B) are preferably solvents that do not miscible with each other. Solvent A and Solvent B are particularly preferably water, and dichloromethane, respectively.

Additives, other than the physiologically active material and the base material, may be dissolved in Liquid A and Liquid B. The surfactant is added to Liquid B in order to stabilize a resultant W/O emulsion.

<Preparation Step>

The granulating step is a step including preparing a dispersion liquid with Liquid A and Liquid B.

Note that, the term "dispersion liquid" means a suspension liquid where one material (dispersoid) is suspended as fine particles in another material (dispersion medium). In the present specification, another material (dispersion medium) mentioned above is Liquid B, and one material (dispersoid) mentioned above is Liquid A.

A method for preparing the dispersion liquid in the preparing step is not particularly limited and may be appropriately selected depending on the intended purpose, as long as the dispersion liquid can be prepared with Liquid A and Liquid B. Examples thereof include a method for mixing and stirring Liquid A and Liquid B.

A method for mixing Liquid A and Liquid B is not particularly limited and may be appropriately selected depending on the intended purpose. Examples thereof include a method where Liquid A is added to a container in which Liquid B is charged.

A method for stirring Liquid A and Liquid B is not particularly limited and may be appropriately selected depending on the intended purpose. Examples thereof include stirring using a stirrer, and stirring using a homogenizer.

—Liquid A—

Liquid A is a liquid containing the physiologically active substance, for example, a solution in which the physiologically active substance is dissolved in Solvent A. Liquid A may further include other components according to the necessity.

In the present specification, the term "dissolve" means a state where the physiologically active substance cannot be visually observed in a solvent that is stirred, when the physiologically active substance is added to the solvent and stirred in an environment of room temperature and ambient pressure.

—Physiologically Active Substance—

As a preferred embodiment, the physiologically active substance has a characteristic that bioactivity thereof changes by chemical or physical stimuli, such as heating, cooling, shaking, stirring, and a change in pH.

In the present specification, the term "physiologically active substance" means an active ingredient used for exhibiting physiological effects on living matter. Examples of the physiologically active substance include: low molecular weight compounds having bioactivity, such as pharmaceutical compounds, edible compounds, and cosmetic compounds; and polymer compounds having bioactivity and including biopolymers, such as proteins (e.g., antibodies and enzymes), and nucleic acids (e.g., DNA and RNA).

Moreover, the term "physiological effect" means an effect obtained as a result of bioactivity of the physiologically active substance exhibited at a target site, and examples thereof include quantitative and/or qualitative changes or influences on organisms, tissues, cells, proteins, DNAs, RNAs, etc. Moreover, the term "bioactivity" means that the physiologically active substance functions to change or affect a target site (e.g., target tissues).

For example, the target site is preferably a receptor etc. present on a surface of a cell or within a cell. In this case, a signal is transmitted to a cell by bioactivity, which is binding of the physiologically active substance to a specific receptor, and as a result, a physiological effect is exhibited. The physiologically active substance may be a substance which is turned into a mature form by an enzyme in vivo and is bonded to a specific receptor as the mature form to thereby exhibit a physiological effect. In this case, a substance before turned into a mature form is also included in the scope of the physiologically active substance.

The physiologically active substance may be a substance created by a living organism (human or creatures other than human), or an artificially synthesized substance.

In the present disclosure, the polymer compound having bioactivity is included in the physiologically active substance. Examples thereof include polymer compounds, such as proteins (e.g., antibodies and enzymes) and nucleic acids (e.g., DNA, and RNA). Among the above-listed examples, particularly, an antibody tends to decrease bioactivity thereof depending on an organic solvent for use or a temperature. Examples of the "characteristics the bioactivity changes" used in the present disclosure include a characteristic that the bioactivity level increases or decreases, a characteristic that the bioactivity efficiency increases or decreases, and a characteristic that a behavior of the bioactivity changes. Among the above-listed examples, the characteristic that the bioactivity level decreases or the characteristic that the bioactivity efficiency decreases is preferable, and the characteristic that the bioactivity level decreases is more preferable. Moreover, examples of the change in the bioactivity include a reversible change and an irreversible change. Among the above-listed examples, a characteristic that the bioactivity irreversibly changes is preferable.

In the present disclosure, the term "heating" and the term "cooling" basically means applying thermal energy to the liquid including the physiologically active substance, and taking thermal energy away from the liquid, respectively. When "heating" or "cooling" is performed, bioactivity may change due to a change in a molecular structure or stereo-structure of the physiologically active substance. In the case where the physiologically active substance is protein, specific examples of the change include thermal denaturation of protein and cold denaturation of protein. In the case where the physiologically active substance is nucleic acid, moreover, specific examples thereof include decomposition of nucleic acid. As described above, the "temperature at which the bioactivity of the physiologically active substance changes" varies depending on the physiologically active substance for use, but a person skilled in the art can easily understand the temperature based on the present specification.

—Low-Molecular Weight Compound Having Bioactivity—

The low-molecular weight compound having bioactivity typically includes a natural synthetic substance having a molecular weight of from several hundreds through several thousands. The molecular weight may be a weight average molecular weight or a number average molecular weight.

As the low-molecular weight compound, moreover, there are a material equivalent to the above-mentioned poorly water-soluble material, and a material equivalent to the above-mentioned water-soluble material.

The poorly water-soluble material is a material having a water/octanol partition coefficient (log P value) of 3 or greater, as measured according to JIS Z 7260-107. Moreover, the water-soluble material is a material having a water/octanol partition coefficient (log P value) of less than 3, as measured according to JIS Z 7260-107.

The low-molecular weight compound may be in the form of a salt, or hydrate, as long as the low-molecular weight compound functions as a physiologically active substance.

The poorly water-soluble material is not particularly limited and may be appropriately selected depending on the intended purpose. Examples of the poorly water-soluble compound include griseofulvin, itraconazole, norfloxacin, tamoxifen, cyclosporine, glibenclamide, troglitazone, nifedipine, phenacetin, phenytoin, digitoxin, nilvadipine, diazepam, chloramphenicol, indomethacin, nimodipine, dihydroergotoxine, cortisone, dexamethasone, naproxen, tulobuterol, beclometasone dipropionate, fluticasone propionate, pranlukast, tranilast, loratadine, tacrolimus, amprenavir, bexarotene, calcitriol, clofazimine, digoxin, doxercalciferol, dronabinol, etopodide, isotretinoin, lopinavir, ritonavir, progesterone, saquinavir, sirolimus, tretinoin, amphotericin, fenoldopam, melphalan, paricalcitol, propofol, voriconazole, ziprasidone, docetaxel, haloperidol, lorazepam, teniposide, testosterone, valrubicin. The above-listed examples may be used alone or in combination.

Specific examples of the poorly water-soluble material include kinase inhibitors, such as gefitinib, erlotinib, osimertinib, bosutinib, vandetanib, alectinib, lorlatinib, abemaciclib, tyrphostin AG494, sorafenib, dasatinib, lapatinib, imatinib, motesanib, lestaurtinib, tandutinib, dorsomorphin, axitinib, 4-benzyl-2-methyl-1,2,4-thiadiazolidine-3,5-dione.

The water-soluble material is not particularly limited and may be appropriately selected depending on the intended purpose. Examples of the water-soluble material include abacavir, acetaminophen, acyclovir, amiloride, amitriptyline, antipyrine, atropine, buspirone, caffeine, captopril, chloroquine, chlorpheniramine, cyclophosphamide, diclofenac, desipramine, diazepam, diltiazem, diphenhydramine, disopyramide, doxine, doxycycline, enalapril, ephedrine, ethambutol, ethinylestradiol, fluoxetine, imipramine, glucose, ketorol, ketoprofen, labetalol, levodopa, levofloxacin, metoprolol, metronidazole, midazolam, minocycline, misoprostol, metformin, nifedipine, phenobarbital, prednisolone, promazine, propranolol, quinidine, rosiglitazone, salicylic acid, theophylline, valproic acid, verapamil, and zidovudine. The above-listed examples may be used alone or in combination.

—Polymer Compound Having Bioactivity—

The polymer compound having bioactivity is not particularly limited and may be appropriately selected depending on the intended purpose. Examples of the polymer compound include biopolymer compounds. Examples thereof include polypeptide (e.g., nucleic acid, and protein), saccharides, and lipids. The above-listed examples may be used alone or in combination.

—Nucleic Acid—

Examples of the nucleic acid typically include DNA, RNA, and a combination thereof, which may be substituted with chemically-modified nucleic acid part of entire sequence of which is chemically modified. Moreover, examples of the nucleic acid also include chemically synthetized nucleic acid analogues, such as peptide nucleic acid (PNA), and morpholino antisense oligo.

When the aim is to suppress expression of a target gene, for example, examples of the nucleic acid include an antisense nucleic acid complementary to a transcription product of a target gene or part of the transcription product thereof, a nucleic acid having ribozyme activity that causes specific cleavage of a transcription product of a target gene, a short-chain nucleic acid having a function of suppressing expression of a target gene due to RNAi interference, microRNA (miRNA), aptamer, locked nucleic acid obtained by modifying oligonucleotide.

—Polypeptide Including Protein—

A polypeptide is a polymer formed of a plurality of amino acids. Among polypeptides, those having a higher-order structure and exhibiting a function derived from the higher-order structure are particularly referred to as proteins.

For example, the polypeptide includes both a polypeptide that is not being modified from the original state exiting in the nature, and a polypeptide that is modified.

Examples of the modification include acetylation, acylation, ADP-ribosylation, amidation, a covalent bond of flavin, a covalent bond of a heme moiety, a covalent bond of nucleotide or a nucleotide derivative, a covalent bond of lipid or a lipid derivative, a covalent bond of phosphatidylinositol, crosslink, cyclization, formation of a disulfide bond, demethylation, formation of covalent crosslink, formation of cystine, formation of pyroglutamate, formylation, γ-carboxylation, glycosylation, formation of GPI anchor, hydroxylation, iodination, methylation, myristoylation, oxidation, a protein decomposition treatment, phosphorylation, prenylation, racemization, selenoylation, sulfation, tRNA mediation addition of amino acid to protein, such as arginylation, and ubiquitination.

When the aim is to inhibit or suppress a function of a target protein, examples of the protein include a target protein variant that is dominant-negative to the target protein, antibody that binds to a target protein, and enzyme.

The antibody may be a polyclonal antibody or monoclonal antibody, or a polyspecific antibody, such as a bispecific antibody and a trispecific antibody, as long the antibody binds to a target protein. The antibody may be any antibody derived from animals, as long as the antibody exhibits a physiological effect. The antibody is preferably a human antibody, a human chimeric antibody, or a humanized antibody.

The term "antibody" typically means an immunoglobulin molecule, such as IgG, IgE, IgM, IgA, and IgD. In the present specification, the "antibody" includes an antibody fragment including an antigen binding region (e.g., F(ab')2 fragment, Fab' fragment, Fab fragment, Fv fragment, rIgG fragment, and a single chain antibody), and a modified antibody (e.g., a labeled antibody).

Examples of the enzyme include hydrolase, phosphorylase, dephosphorylase, transferase, oxidoreductase, lyase, isomerase, and synthesized enzyme.

—Saccharides—

Examples of the saccharides include monosaccharide, disaccharide, oligosaccharide, and polysaccharide. Moreover, the saccharides also include complex carbohydrates, in which the saccharides are bonded to proteins or lipids via a covalent bond, and glycosides, in which aglycone, such as alcohol, phenol, saponin, and a dye, is bonded to a reducing group of saccharide.

—Lipids—

Examples of the liquids include simple lipids, complex lipids, and derived lipids.

The physiologically active substance is preferably a biopharmaceuticals, and more preferably an antibody whose bioactivity tends to be reduced.

An amount of the physiologically active substance is not particularly limited and may be appropriately selected depending on the intended purpose. For example, the amount thereof is preferably 0.05% by mass or greater but 50% by mass or less, and more preferably 0.1% by mass or greater but 20% by mass or less, relative to a total amount of Liquid A.

—Solvent A—

Solvent A is not particularly limited and may be appropriately selected depending on the intended purpose, as long as Solvent A can dissolve the physiologically active substance. Examples thereof include water and hexafluoro-2-propanol (HFIP).

An amount of Solvent A is preferably 50% by mass or greater but 99.9% by mass or less, and more preferably 90% by mass or greater but 99.9% by mass or less, relative to a total amount of Liquid A. When the amount of Solvent A is 50% by mass or greater but 99.9% by mass or less, stable dispersion liquid can be produced.

—Other Components—

Other components are not particularly limited and may be appropriately selected depending on the intended purpose. Examples thereof include a buffer solution.

—Liquid B—

Liquid B is a liquid containing the base material and the surfactant, for example, a solution in which the base material and the surfactant are dissolved in Solvent B. Liquid B may further include other components according to the necessity.

The expression "being dissolved" here means a state where solids, i.e., the base material, cannot be visually recognized in a stirred solvent, when the base material and the surfactant are added and stirred in a solvent in an environment of room temperature and ambient pressure.

—Base Material—

In the present specification, the term "base material" refers to a component included in the particles, and is a material that is a base for constituting each particles.

The base material is a material that is a base for constituting particles. Therefore, the base material is preferably a solid at room temperature.

The base material is not particularly limited as long as the base materials not a material does not adversely affect the physiologically active substance included in the particles together with the base material. The base material may be a low-molecular weight material or a high-molecular weight material.

The particles of the present disclosure are preferably particles applied for living matter. Therefore, the base material is preferably a material that is not toxic to living matter.

The low-molecular weight material is preferably a compound having a weight average molecular weight of less than 15,000.

The high-molecular weight material is preferably a compound having a weight average molecular weight of 15,000 or greater.

As described above, the base material for use may be one base material, or two or more base materials. Any of the base materials described below may be used in combination.

—Low-Molecular Weight Material—

The low-molecular weight material is not particularly limited and may be appropriately selected depending on the intended purpose. Examples of the low-molecular weight material include lipids, saccharides, cyclodextrins, amino acids, and organic acids. The above-listed examples may be used alone or in combination.

—Lipids—

The lipids are not particularly limited and may be appropriately selected depending on the intended purpose. Examples of the lipids include medium or long chain monoglyceride, medium or long chain diglyceride, medium or long chain triglyceride, phospholipid, vegetable oil (e.g., soybean oil, avocado oil, squalene oil, sesame oil, olive oil, corn oil, rapeseed oil, safflower oil, and sunflower oil), fish oil, seasoning oil, water-insoluble vitamins, fatty acids, mixtures thereof, and derivatives thereof. The above-listed examples may be used alone or in combination.

—Saccharides—

The saccharides are not particularly limited and may be appropriately selected depending on the intended purpose. Examples of the saccharides include: monosaccharides and polysaccharides, such as glucose, mannose, idose, galactose, fucose, ribose, xylose, lactose, sucrose, maltose, trehalose, turanose, raffinose, maltotriose, acarbose, cyclodextrins, amylose (starch), and cellulose; sugar alcohols (polyols), such as glycerin, sorbitol, lactitol, maltitol, mannitol, xylitol, and erythritol; and derivatives thereof. The above-listed examples may be used alone or in combination.

—Cyclodextrins—

The cyclodextrins are not particularly limited and may be appropriately selected depending on the intended purpose. Examples of the cyclodextrins include hydroxypropyl-β-cyclodextrin, β-cyclodextrin, γ-cyclodextrin, α-cyclodextrin, and cyclodextrin derivatives. The above-listed examples may be used alone or in combination.

—Amino Acids—

The amino acids are not particularly limited and may be appropriately selected depending on the intended purpose. Examples of the amino acids include valine, lysine, leucine, threonine, isoleucine, asparagine, glutamine, phenylalanine, aspartic acid, serine, glutamic acid, methionine, arginine, glycine, alanine, tyrosine, proline, histidine, cysteine, tryptophan, and derivatives thereof. The above-listed examples may be used alone or in combination.

—Organic Acids—

The organic acids are not particularly limited and may be appropriately selected depending on the intended purpose. Examples of the organic acids include adipic acid, ascorbic acid, citric acid, fumaric acid, gallic acid, glutaric acid, lactic acid, malic acid, maleic acid, succinic acid, tartaric acid, and derivatives thereof. The above-listed examples may be used alone or in combination.

—High-Molecular Weight Material—

The high-molecular weight material is not particularly limited and may be appropriately selected depending on the intended purpose. Examples of the high-molecular weight material include water-soluble cellulose, polyalkylene glycol, poly(meth)acrylamide, poly(meth)acrylic acid, poly(meth)acrylic acid ester, polyallylamine, polyvinyl pyrrolidone, polyvinyl alcohol, polyvinyl acetate, biodegradable resins, polyglycolic acid, polyamino acid, gelatin, protein (e.g., fibrin), polysaccharides, and derivatives thereof. The above-listed examples may be used alone or in combination.

—Water-Soluble Cellulose—

The water-soluble cellulose is not particularly limited and may be appropriately selected depending on the intended purpose. Examples of the water-soluble cellulose include: alkyl cellulose, such as methyl cellulose, and ethyl cellulose; hydroxyalkyl cellulose, such as hydroxyethyl cellulose and hydroxypropyl cellulose; and hydroxyalkyl alkyl cellulose, such as hydroxyethyl methyl cellulose and hydroxypropyl methyl cellulose. The above-listed examples may be used alone or in combination. Among the above-listed examples, hydroxypropyl cellulose and hydroxypropyl methyl cellulose are preferable, and hydroxypropyl cellulose is more preferable because of high biocompatibility and high solubility to a solvent for producing particles.

—Hydroxypropyl Cellulose—

As the hydroxypropyl cellulose, various products having different viscosities are available on the market from manufacturers. Any of such commercial products can be used for the base material of the present disclosure. A viscosity of a 2% by mass hydroxypropyl cellulose aqueous solution (20 degrees Celsius) is not particularly limited and may be appropriately selected depending on the intended purpose. The viscosity thereof is preferably 2.0 mPa·s (centipoise, cps) or greater but 4,000 mPa·s (centipoise, cps) or less.

Moreover, it seems that the viscosity of the hydroxypropyl cellulose depends on a weight average molecular weight, substitution degree, and molecular weight of the hydroxypropyl cellulose.

The weight average molecular weight of the hydroxypropyl cellulose is not particularly limited and may be appropriately selected depending on the intended purpose. The weight average molecular weight thereof is preferably 15,000 or greater but 400,000 or less. The weight average molecular weight thereof can be measured, for example, by gel permeation chromatography (GPC).

A commercial product of the hydroxypropyl cellulose is not particularly limited and may be appropriately selected depending on the intended purpose. Examples of the commercial product thereof include HPC-SSL having a molecular weight of 15,000 or greater but 30,000 or less and viscosity of 2.0 mPa·s or greater but 2.9 mPa·s or less, HPC-SL having a molecular weight of 30,000 or greater but 50,000 or less and viscosity of 3.0 mPa·s or greater but 5.9 mPa·s or less, HPC-L having a molecular weight of 55,000 or greater but 70,000 or less and viscosity of 6.0 mPa·s or greater but 10.0 mPa·s or less, HPC-M having a molecular weight of 110,000 or greater but 150,000 or less and viscosity of 150 mPa·s or greater but 400 mPa·s or less, and HPC-H having a molecular weight of 250,000 or greater but 400,000 or less and viscosity of 1,000 mPa·s or greater but 4,000 mPa·s or less (all available from Nippon Soda Co., Ltd.). The above-listed examples may be used alone or in combination. Among the above-listed examples, HPC-SSL having a molecular weight of 15,000 or greater but 30,000 or less and viscosity of 2.0 mPa·s or greater but 2.9 mPa·s or less is preferable. The molecular weights of the above-listed commercial products can be measured by gel permeation chromatography (GPC), and the viscosity thereof is measured using a 2% by mass aqueous solution (20 degrees Celsius).

—Polyalkylene Glycol—

The polyalkylene glycol is not particularly limited and may be appropriately selected depending on the intended purpose. Examples thereof include polyethylene glycol (PEG), polypropylene glycol, polybutylene glycol, and copolymers thereof. The above-listed examples may be used alone or in combination.

—Poly(Meth)Acrylamide—

The poly(meth)acrylamide is not particularly limited and may be appropriately selected depending on the intended purpose. Examples thereof include polymers of monomers, such as N-methyl(meth)acrylamide, N-ethyl(meth)acrylamide, N-propyl(meth)acrylamide, N-butyl(meth)acrylamide, N-benzyl(meth)acrylamide, N-hydroxyethyl(meth)acrylamide, N-phenyl(meth)acrylamide, N-tolyl(meth)acrylamide, N-(hydroxyphenyl)(meth)acrylamide, N-(sulfamoylphenyl)(meth)acrylamide, N-(phenylsulfonyl)(meth)acrylamide, N-(tolylsulfonyl)(meth)acrylamide, N,N-dimethyl(meth)acrylamide, N-methyl-N-phenyl(meth)acrylamide, and N-hydroxyethyl-N-methyl(meth)acrylamide. Any of the above-listed monomers may be polymerized alone, or a combination thereof may be polymerized together. Moreover, the above-listed polymers may be used alone or in combination.

—Poly(Meth)Acrylic Acid—

The poly(meth)acrylic acid is not particularly limited and may be appropriately selected depending on the intended purpose. Examples thereof include: homopolymers, such as polyacrylic acid and polymethacrylic acid; and copolymers, such as acrylic acid-methacrylic acid copolymer. The above-listed examples may be used alone or in combination.

—Poly(Meth)Acrylic Acid Ester—

The poly(meth)acrylic acid ester is not particularly limited and may be appropriately selected depending on the intended purpose. Examples thereof include polymers of monomers, such as ethylene glycol di(meth)acrylate, diethylene glycol di(meth)acrylate, propylene glycol di(meth)acrylate, glycerol poly(meth)acrylate, polyethylene glycol (meth)acrylate, trimethylolpropane tri(meth)acrylate, pentaerythritol tetra(meth)acrylate, and 1,3-butyleneglycol di(meth)acrylate. Any of the above-listed monomers may be polymerized alone, or a combination thereof may be polymerized together. Moreover, the above-listed polymers may be used alone or in combination.

—Polyallylamine—

The polyallylamine is not particularly limited and may be appropriately selected depending on the intended purpose. Examples thereof include diallylamine, and triallylamine. The above-listed examples may be used alone or in combination.

—Polyvinylpyrrolidone—

As the polyvinylpyrrolidone, a commercial product may be used. The commercial product of the polyvinylpyrrolidone is not particularly limited and may be appropriately selected depending on the intended purpose. Examples of the commercial product thereof include PLASDONE C-15 (available from ISP TECHNOLOGIES); KOLLIDON VA 64, KOLLIDON K-30, and KOLLIDON CL-M (all available from KAWARLAL); and KOLLICOAT IR (available from BASF). The above-listed examples may be used alone or in combination.

—Polyvinyl Alcohol—

The polyvinyl alcohol is not particularly limited and may be appropriately selected depending on the intended purpose. Examples of the polyvinyl alcohol include silanol-modified polyvinyl alcohol, carboxyl-modified polyvinyl alcohol, and acetoacetyl-modified polyvinyl alcohol. The above-listed examples may be used alone or in combination.

—Polyvinyl Acetate—

The polyvinyl acetate is not particularly limited and may be appropriately selected depending on the intended purpose. Examples thereof include vinyl acetate-crotonic acid copolymer, and vinyl acetate-itaconic copolymer. The above-listed examples may be used alone or in combination.

—Biodegradable Resin—

The biodegradable resin is not particularly limited and may be appropriately selected depending on the intended purpose. Examples of the biodegradable resin include biodegradable polyester. Examples of the biodegradable polyester include: polylactic acid; poly-ε-caprolactone; succinate-based polymers (polylactic acid-glycolic acid copolymers), such as polyethylene succinate, polybutylene succinate, and polybutylene succinate adipate; polyhydroxyalkanoate, such as polyhydroxypropionate, polyhydroxy butyrate, and polyhydroxy valerate; and polyglycolic acid. The above-listed examples may be used alone or in combination. Among the above-listed examples, polylactic acid is preferable because the polylactic acid has high biocompatibility, and a physiologically active substance included therein can be gradually released.

—Polylactic Acid—

The weight average molecular weight of the polylactic acid is not particularly limited and may be appropriately selected depending on the intended purpose. The weight average molecular weight thereof is preferably 5,000 or greater but 100,000 or less, more preferably 10,000 or greater but 70,000 or less, even more preferably 10,000 or greater but 50,000 or less, and particularly preferably 10,000 or greater but 30,000 or less.

An amount of the polylactic acid is not particularly limited and may be appropriately selected depending on the intended purpose. The amount of the polylactic acid is preferably 50% by mass or greater, more preferably 50% by mass or greater but 99% by mass or less, even more preferably 75% by mass or greater but 99% by mass or less, and particularly preferably 80% by mass or greater but 99% by mass or less, relative to a mass of the base material.

—Polyglycolic Acid—

The polyglycolic acid is not particularly limited and may be appropriately selected depending on the intended purpose. Examples thereof include: a lactic acid-glycolic acid polymer that is a copolymer including a structural unit derived from lactic acid and a structural unit derived from glycolic acid; a glycolic acid-caprolactone copolymer that is a copolymer including a structural unit derived from glycolic acid and a structural unit derived from caprolactone; and a glycolic acid-trimethylene carbonate copolymer that is a copolymer including a structural unit derived from glycolic acid and a structural unit derived from trimethylene carbonate. The above-listed examples may be used alone or in combination. Among the above-listed examples, a lactic acid-glycolic acid polymer is preferable because the lactic acid-glycolic acid polymer has high, can gradually release a physiologically active substance contained therein, and can store the physiologically active substance contained therein over a long period of time.

The weight average molecular weight of the lactic acid-glycolic acid copolymer is not particularly limited and may be appropriately selected depending on the intended purpose. The weight average molecular weight thereof is preferably from 2,000 through 250,000, more preferably from 2,000 through 100,000, even more preferably from 3,000 through 50,000, and particularly preferably from 5,000 through 10,000. A molar ratio (L:G) of the structural unit (L) derived from lactic acid to the structural unit (G) derived from the glycolic acid in the lactic acid-glycolic acid copolymer is not particularly limited and may be appropriately selected depending on the intended purpose. The molar ratio (L:G) is preferably from 1:99 through 99:1, more preferably from 25:75 through 99:1, even more preferably from 30:70 through 90:10, and particularly preferably from 50:50 through 85:15.

An amount of the lactic acid-glycolic acid copolymer is not particularly limited and may be appropriately selected depending on the intended purpose. The amount of the lactic acid-glycolic acid copolymer is preferably 50% by mass or greater, more preferably 50% by mass or greater but 99% by mass or less, even more preferably 75% by mass or greater but 99% by mass or less, and particularly preferably 80% by mass or greater but 99% by mass or less, relative to a mass of the base material.

—Polyamino Acid—

The polyamino acid is not particularly limited and may be appropriately selected depending on the intended purpose.

The polyamino acid may be a polymer of any appropriately selected combination of the above-listed amino acids, but preferably a polymer of single amino acid. Preferable examples of the polyamino acid include: homopolymers of amino acid, such as poly-α-glutamic acid, poly-γ-glutamic acid, polyaspartic acid, polylysine, polyarginine, polyornithine, and polyserine; and copolymers thereof. The above-listed examples may be used alone or in combination.

—Gelatin—

The gelatin is not particularly limited and may be appropriately selected depending on the intended purpose. Examples of the gelatin include alkali processed gelatin, acid processed gelatin, gelatin hydrolysate, enzymatically dispersed gelatin, and derivatives thereof. The above-listed examples may be used alone or in combination.

A natural dispersant polymer used for the gelatin derivative is not particularly limited and may be appropriately selected depending on the intended purpose. Examples thereof include protein, polysaccharides, and nucleic acid. Examples thereof also include a copolymer including a natural dispersant polymer or a synthetic dispersant polymer. The above-listed examples may be used alone or in combination.

The gelatin derivative refers to gelatin derivatized by covalently binding a hydrophobic group to a gelatin molecule.

The hydrophobic group is not particularly limited and may be appropriately selected depending on the intended purpose. Examples of the hydrophobic group include: polyesters, such as polylactic acid, polyglycolic acid, and poly-ε-caprolactone; lipids, such as cholesterol and phosphatidyl ethanolamine; aromatic groups including alkyl groups and benzene rings; heterocyclic aromatic groups; and mixtures thereof.

The protein is not particularly limited and may be appropriately selected depending on the intended purpose, as long as the protein for use does not adversely affect the bioactivity of the physiologically active substance. Examples of the protein include collagen, fibrin, and albumin. The above-listed examples may be used alone or in combination.

The polysaccharides is not particularly limited and may be appropriately selected depending on the intended purpose. Examples of the polysaccharides include chitin, chitosan, hyaluronic acid, alginic acid, starches, and pectin. The above-listed examples may be used alone or in combination.

Since the base material is preferably a material with which resulting particles including the material can be added to a pharmaceutical preparation, a functional food product, and a functional cosmetic product, the base material is preferably a material that does not have ecotoxicity, particularly, a biodegradable material, such as a biodegradable polymer.

An amount of the base material is preferably 0.1% by mass or greater but 50% by mass or less, and more preferably 1% by mass or greater but 20% by mass or less, relative to a total amount of Liquid B. When the amount of the base material is 0.1% by mass or greater but 50% by mass or less, a stable dispersion liquid can be produced.

—Surfactant—

The surfactant is not particularly limited and may be appropriately selected depending on the intended purpose. Examples of the surfactant include benzalkonium chloride, lecithin, sorbitan fatty acid ester, polyoxyethylene hydrogenated castor oil, polyoxyethylene polyoxypropylene glycol, polyoxyethylene orbitan monooleate, polyvinyl alcohol, sorbitan monooleate, glycerin monostearate, sorbitan sesquioleate, sorbitane monostearate, glyceryl monostearate, polyglycerol fatty acid ester, polysorbate (e.g., polysorbate 80), a polyoxyethylene-polyoxypropylene copolymer; and sodium lauryl sulfate. The above-listed examples may be used alone or in combination.

As an index of the surfactant, there is hydrophilic-lipophilic balance. In the present disclosure, the hydrophilic-lipophilic balance is preferably 1 or greater but 8 or less, and more preferably 3 or greater but 6 or less. Among the above-listed examples, sorbitan sesquioleate (hydrophilic-lipophilic balance: 4) is particularly preferable. The above-listed examples may be used alone or in combination.

An amount of the surfactant is preferably 0.1% by mass or greater but 5% by mass or less, and more preferably 0.1% by mass or greater but 1% by mass or less, relative to a total amount of Liquid B. When the amount of the surfactant is 0.1% by mass or greater but 5% by mass or less, formed particles can be collected as a powder. Specifically, the base material cannot be sufficiently dispersed when the amount of the surfactant is insufficient, and surface tension of the base material is weak and formed particles cannot be collected as a powder when the amount of the surfactant is excessive.

—Solvent B—

Solvent B is not particularly limited and may be appropriately selected depending on the intended purpose, as long as Solvent B can dissolve the base material. Examples thereof include dichloromethane, methyl acetate, and hexafluoro-2-propanol.

An amount of Solvent B is preferably 50% by mass or greater but 99.9% by mass or less, and more preferably 70% by mass or greater but 99.9% by mass or less, relative to a total amount of Liquid B. When the amount of Solvent B is 50% by mass or greater but 99.9% by mass or less, a stable dispersion liquid can be produced.

—Other Components—

Other components are not particularly limited and may be appropriately selected depending on the intended purpose.

As the amount of Liquid A and the amount of Liquid B in the dispersion liquid, a ratio (mass of Liquid A:mass of Liquid B) is preferably from 0.5:99.5 through 30:70, and more preferably from 1:99 through 20:80.

The viscosity of the dispersion liquid is not particularly limited and may be appropriately selected depending on the intended purpose. The viscosity thereof is preferably 0.5 mPa·s or greater but 15.0 mPa·s or less, and more preferably 0.5 mPa·s or greater but 10.0 mPa·s or less. Note that, the viscosity can be measured, for example, by means of a viscoelasticity measurement device (device name: MCR rheometer, available from AntonPaar) at 25 degrees Celsius, and at a shear rate of 10 $s^{-1}$. The viscosity of the liquid being 0.5 mPa·s or greater but 15.0 mPa·s or less is preferable because desirable ejection can be performed when a unit for ejecting droplets is used.

The surface tension of the dispersion liquid is not particularly limited and may be appropriately selected depending on the intended purpose. The surface tension thereof is preferably 10 mN/m or greater but 60 mN/m or less, and more preferably 20 mN/m or greater but 50 mN/m or less. Note that, the surface tension may be measured by a maximum foaming pressure method using, for example, a portable surface tensiometer (device name: POCKET-DYNE, available from KRUSS) under the conditions of 25 degrees Celsius and a lifetime of 1,000 ms. The surface tension of the liquid being 0.5 mPa·s or greater but 15.0 mPa·s or less is preferable because droplets are desirably ejected from the above-described unit.

<Granulating Step>

The granulating step is a step including forming particles from the prepared dispersion liquid.

Examples of a method for forming particles include: a method including a step including forming the prepared dispersion liquid into droplets, and a step drying the droplets of the dispersion liquid.

<<Step for Forming Dispersion Liquid into Droplets>>

The step including forming the prepared dispersion liquid into droplets is a step for tuning the dispersion liquid into droplets. The step for turning the prepared dispersion liquid into droplets is not particularly limited and may be appropriately selected depending on the intended purpose. Examples thereof include a method for spraying the dispersion liquid in a gas, and a method for ejecting the dispersion liquid by the droplet-ejecting unit to form droplets.

Examples of the method for spraying the dispersion liquid into a gas include a pressure nozzle method where the liquid is pressed to eject the liquid from a nozzle, and a disk method where the liquid is fed to a disk rotating at high speed to scatter the liquid by centrifugal force.

Examples of the method for ejecting the dispersion liquid with the droplet-ejecting unit to form droplets include the following methods.

(a) A method using a volume-changing unit configured to change a volume of a liquid storage unit using vibrations.

(b) A method using a constriction-generating unit configured to release a liquid from a plurality of ejection holes provided in the liquid storage unit with applying vibrations to the liquid storage unit, and to form the liquid into droplets from the column state to constriction state.

(c) A method using a nozzle-vibrating unit configured to a thin film in which vibrate nozzles are formed.

Each unit will be described hereinafter.

The volume-changing unit is not particularly limited and may be appropriately selected depending on the intended purpose, as long as the volume-changing unit can change a volume of the liquid storage unit. Examples thereof include a piezoelectric element that expands or contracts upon application of voltage (may be referred to as a "piezo element").

Examples of the constriction-generating unit include units using techniques disclosed in Japanese Unexamined Patent Application Publication No. 2007-199463. Japanese Unexamined Patent Application Publication No. 2007-199463 discloses a unit configured to release a liquid from a plurality of nozzle holes provided in a liquid storage unit with applying vibrations to the liquid storage unit using a piezoelectric element in contact with part of the liquid storage unit, to thereby turn the liquid into droplets from the column state to the constriction state.

Examples of the nozzle-vibrating unit include units using techniques disclosed in Japanese Unexamined Patent Application Publication No. 2008-292976. Japanese Unexamined Patent Application Publication No. 2008-292976 discloses a unit configured to release a liquid from a plurality of nozzle holes to form the liquid into droplets using a thin film disposed in a liquid storage unit and having a plurality of nozzles formed therein, and a piezoelectric element disposed in a region within which the thin film can be deformed and configured to vibrate the thin film.

As the unit for generating vibrations, a piezoelectric element is generally used. The piezoelectric element is not particularly limited, and a shape, size, and material thereof are appropriately selected. For example, a piezoelectric element used for a conventional inkjet ejection system can be suitably used.

The shape and size of the piezoelectric element are not particularly limited, and may be appropriately selected depending on a shape of the ejection hole.

A material of the piezoelectric element is not particularly limited and may be appropriately selected depending on the intended purpose. Examples of the material include: piezoelectric ceramics, such as lead zirconate titanate (PZT); piezoelectric polymers, such as polyvinylidene fluoride (PVDF); and monocrystals, such as quartz, $LiNbO_3$, $LiTaO_3$, and $KNbO_3$.

The ejection hole is not particularly limited and may be appropriately selected depending on the intended purpose. Examples thereof include an opening provided in a nozzle plate.

A cross-sectional shape and size of the ejection hole are appropriately selected.

The cross-sectional shape of the ejection hole is not particularly limited and may be appropriately selected depending on the intended purpose. Examples thereof include: (1) such a tapered shape that an opening diameter is decreased from the inner part (the liquid storage unit side) of the ejection hole towards the outer part (the liquid ejection side); (2) such a shape that an opening diameter is narrowed with maintaining the round shape from the inner part (the liquid storage unit side) of the ejection hole towards the outer part (the liquid ejection side); (3) such a shape that an opening diameter is narrowed from the inner part (the liquid storage unit side) of the ejection hole towards the outer part (the liquid ejection side) with maintaining a constant nozzle angle; and (4) a combination of the shape of (1) and the shape of (2). Among the above-listed examples, the shape of (3) is preferable because the pressure applied to the liquid at the ejection hole becomes the maximum.

The nozzle angle of the shape of (3) is not particularly limited and may be appropriately selected depending on the intended purpose. The nozzle angle is preferably 60 degrees or greater but 90 degrees or less. When the nozzle angle is 60 degrees or greater but 90 degrees or less, ejection of droplets can be stabilized.

A size of the ejection hole is not particularly limited and may be appropriately selected depending on the intended purpose. For example, a diameter of the ejection hole is preferably smaller than 1,000 micrometers, more preferably 1.0 micrometers or greater but smaller than 1,000 micrometers, even more preferably 1.0 micrometers or greater but 500 micrometers or smaller, and particularly preferably 1.0 micrometers or greater but 50 micrometers or smaller. When the shape of the ejection hole is not a true circle, a diameter of a true circle having the same area to the area of the ejection hole is determined as the diameter of the ejection hole.

<<Step for Drying Droplets of Dispersion Liquid>>

The step for drying the droplets of the dispersion liquid is a step including evaporating the solvent from the droplets to remove the solvent included in the droplets. The step for drying the droplets of the dispersion liquid is not particularly limited and may be appropriately selected depending on the intended purpose, as long as the droplets of the dispersion liquid can be dried. Examples thereof include a method where the droplets released in gas are allowed to jet in the gas during the process for forming droplets of the dispersion liquid.

In the granulating step, particles may be granulated by ejecting droplets into a transport gas flow to evaporate the solvent from the droplets.

A method for evaporating the solvent from the droplets using the transport gas flow is not particularly limited and may be appropriately selected depending on the intended purpose. As the method, for example, preferred is a method for arranging a traveling direction of the transport gas flow to be substantially vertical to the direction along which droplets are ejected.

A temperature, vapor pressure, and gas of the transport gas flow are preferably appropriately adjusted. A heating unit may be disposed in order to adjust a temperature of the transport gas flow. As described above, ejection of the droplets is performed in the granulating step in a manner that cohesion of the droplets is suppressed. Since drying of the solvent is accelerated by the transport gas flow, the degree of heat applied by the heating unit can be reduced. Specifically, heating can be performed in a manner that the bioactivity of the physiologically active substance does not change by the heating.

Moreover, the solvent may not be completely evaporated, as long as the collected particles can maintain a solid state. A drying step may be added as a separate step after the collection of the particles. Moreover, a method for evaporating the solvent from the droplets using a temperature change or chemical change may be used.

<Other Steps>

Other steps are not particularly limited and may be appropriately selected depending on the intended purpose. Examples thereof include a particle collecting step.

The particle collecting step is a step including collecting the produced particles. The particle collecting step is preferably performed by a particle collecting unit. The particle collecting unit is not particularly limited and may be appropriately selected depending on the intended purpose. Examples thereof include a cyclone collector, and a back filter.

(Apparatus for Producing Particles)

An apparatus for producing particles for use in the method for producing particles of the present disclosure includes a preparation unit configured to prepare a dispersion liquid with Liquid A and Liquid B, where Liquid A is a solution containing the physiologically active substance, and Liquid B is a solution containing the base material and a surfactant. The apparatus also include a granulating unit configured to eject the dispersion liquid into gas to form particles. Moreover, the apparatus include a liquid storage container, and may further include other units according to the necessity.

<Preparing Unit>

The preparing unit is identical to the unit for performing the preparing step in the method for producing particles of the present disclosure.

<Granulating Unit>

The granulating unit includes a droplet-forming unit configured to form the prepared dispersion liquid into droplets, and a drying unit configured to dry the droplets of the dispersion liquid.

<<Droplet-Forming Unit>>

The droplet-forming unit is not particularly limited and may be appropriately selected depending on the intended purpose, as long as the droplet-forming unit can form the dispersion liquid into droplets. Examples thereof include a droplet-ejecting unit.

The droplet-ejecting unit is a unit configured to eject the dispersion liquid including the base material, the physiologically active substance, and the solvent into gas to thereby form the dispersion liquid into droplets. Examples thereof include a droplet-ejecting unit using a spry nozzle and a droplet-ejecting unit using a disk. A preferable embodiment of the droplet-ejecting unit is a unit configured to apply vibrations to eject the dispersion liquid to thereby form droplets.

The droplet-ejecting unit is connected to a liquid storage container, which will be described later. A member for connecting between the droplet-ejecting unit and the liquid storage container is not particularly limited and may be appropriately selected depending on the intended purpose, as long as the liquid can be supplied from the liquid storage container to the droplet-ejecting unit. Examples of such member include a pipe, and a tube.

The droplet-ejecting unit preferably includes a vibration applying member configured to apply vibrations to the liquid to eject the liquid in the form of droplets. The vibrations are not particularly limited and may be appropriately selected depending on the intended purpose. For example, the frequency is preferably 1 kHz or greater, more preferably 150 kHz or greater, and even more preferably 300 kHz or greater but 500 kHz or less. When the vibrations are 1 kHz or greater, liquid columns ejected from the ejection holes can be formed into droplets with good reproducibility. When the vibrations are 150 kHz or greater, production efficiency can be improved.

Examples of the droplet-ejecting unit including the vibration applying member include inkjet nozzles. As the ejection mechanism of the inkjet nozzles, for example, a liquid column resonance method, a membrane vibration method, a liquid vibration method, a Rayleigh breakup method, etc. may be used.

Next, a specific example of the embodiment will be described based on an embodiment where a liquid column resonance droplet-ejecting unit is used as the droplet-ejecting unit. It is easily understood by a person skilled in the art that the droplet-ejecting unit is not limited to the liquid column resonance droplet-ejecting unit, and other droplet-ejecting units (e.g., an ejection unit using a membrane vibration method, an ejection unit using the Rayleigh breakup method, and an ejection unit using a liquid vibration method) may be used.

First, the liquid column resonance droplet-ejecting unit, which is one element constituting the apparatus for producing particles, will be specifically described.

FIG. 1 is a schematic cross-sectional view illustrating one example of the liquid column resonance droplet-ejecting unit. The liquid column resonance droplet-ejecting unit 11 includes a common liquid supplying path 17 and a liquid-column-resonance liquid chamber 18. The liquid-column-resonance liquid chamber 18 is connected to the common liquid supplying path 17 disposed on one of wall surfaces at both ends in a longitudinal direction. Moreover, the liquid-column-resonance liquid chamber 18 includes an ejection hole 19 and a vibration generating unit 20. The ejection hole 19 is configured to eject liquid droplets 21 and arranged on one of the wall surfaces connected to the wall surfaces at the both ends. The vibration generating unit 20 is configured to generate high frequency vibrations to form liquid column resonance standing waves. Note that, a high frequency power source, which is not illustrated, is coupled to the vibration generating unit 20. Moreover, a flow channel may be disposed. The flow channel is configured to supply a gas flow for transporting liquid droplets 21 ejected from the liquid column resonance ejecting unit 11.

The liquid 14 including the base material, the physiologically active substance, and the good solvent is passed through a liquid supply pipe and introduced into the common liquid supplying path 17 of the liquid column resonance liquid droplet forming unit 11 by a liquid-circulating pump that is not illustrated, and then is supplied to the liquid-column-resonance liquid chamber 18 of the liquid column resonance droplet-ejecting unit 11. Within the liquid-column-resonance liquid chamber 18 charged with the liquid 14, a pressure distribution is formed by liquid column resonance standing waves generated by the vibration generating unit 20. Then, liquid droplets 21 are ejected from the ejection hole 19 disposed in the regions that correspond to anti-nodes of the standing waves where the regions are the sections where the amplitude of the liquid column resonance standing waves is large and pressure displacement is large.

The regions corresponding to anti-nodes of the standing waves owing to the liquid column resonance are regions other than nodes of the standing waves. The regions are preferably regions each having sufficiently large amplitude enough to eject the liquid through the pressure displacement of the standing waves, are more preferably regions having a width corresponding to ±¼ of a wavelength from a position of a local maximum amplitude of a pressure standing wave (i.e., a node of a velocity standing wave) toward positions of a local minimum amplitude.

Even when there are a plurality of openings of the ejection hole, substantially uniform droplets can be formed from the openings as long as the openings of the ejection hole are disposed in the regions corresponding to the anti-nodes of the standing waves. Moreover, ejection of the liquid droplets can be performed efficiently, and clogging of the ejection hole is unlikely to occur. Note that, the liquid 14 passed through the common liquid supplying path 17 travels through a liquid returning pipe (not illustrated) to be returned to the liquid 14. Once the amount of the liquid 14 inside the liquid-column-resonance liquid chamber 18 is reduced by ejection of the droplets 21, a flow rate of the liquid 14 supplied from the column liquid supplying path 17 by suction power generated by the action of the liquid column resonance standing waves inside the liquid-column-resonance liquid chamber 18. As a result, the liquid-column-resonance liquid chamber 18 is refilled with the liquid 14. When the liquid-column-resonance liquid chamber 18 is refilled with the liquid 14, the flow rate of the liquid 14 passed through the common liquid supplying path 17 returns to the previous flow rate.

The liquid-column-resonance liquid chamber 18 of the liquid column resonance droplet-ejecting unit 11 is formed by joining frames with each other. The frames are formed of materials having high stiffness to the extent that a resonance frequency of the liquid is not influenced at a driving frequency (e.g., metals, ceramics, and silicones). As illustrated in FIG. 1, a length L between the wall surfaces at the both ends of the liquid-column-resonance liquid chamber 18 in a longitudinal direction is determined based on the principle of the liquid column resonance described below. Moreover, a plurality of the liquid-column-resonance liquid chambers 18 are preferably disposed per one droplet forming unit in order to drastically improve productivity. The number of the liquid-column-resonance liquid chambers 18 is not particularly limited. The number thereof is preferably 1 or greater but 2,000 or less. The common liquid supplying-path 17 is coupled to and connected to a path for supplying the liquid for each liquid-column-resonance liquid chamber. The common liquid supplying path 17 is connected to a plurality of the liquid-column-resonance liquid chambers 18.

Moreover, the vibration generating unit 20 of the liquid column resonance droplet-ejecting unit 11 is not particularly limited as long as the vibration generating unit 20 is driven at a predetermined frequency. The vibration generating unit is preferably formed by attaching a piezoelectric material onto an elastic plate 9. The frequency is preferably 150 kHz or greater, more preferably 300 kHz or greater but 500 kHz or less from the viewpoint of productivity. The elastic plate constitutes a portion of the wall of the liquid-column-resonance liquid chamber in a manner that the piezoelectric material does not come into contact with the liquid. The piezoelectric material may be, for example, piezoelectric ceramics such as lead zirconate titanate (PZT), and is typically often laminated due to a small displacement amount. Other examples of the piezoelectric material include piezoelectric polymers (e.g., polyvinylidene fluoride (PVDF)) and monocrystals (e.g., crystal, LiNbO$_3$, LiTaO$_3$, and KNbO$_3$). The vibration generating unit 20 is preferably disposed per liquid-column-resonance liquid chamber in a manner that the vibration generating unit 20 can individually control each liquid-column-resonance liquid chamber. It is preferable that the liquid-column-resonance liquid chambers be individually controlled via the elastic plates by partially cutting a block-shaped vibration member, which is formed of one of the above-described materials, according to geometry of the liquid-column-resonance liquid chambers. Moreover, a plurality of openings are formed in the ejection hole 19. In view of productivity, preferably employed is a structure where the ejection hole 19 is disposed along the width direction of the liquid-column-resonance liquid chamber 18. Moreover, the frequency of the liquid column resonance is desirably appropriately determined with checking ejection of droplets, because the frequency of the liquid column resonance varies depending on the arrangement of opening of the ejection hole 19.

<<Drying Unit>>

The drying unit is a unit configured to evaporate the solvent from the droplets to remove the solvent included in the droplet, to thereby granulate particles.

Examples of the drying unit include a member configured to form a space for evaporating the solvent from the droplets.

The drying unit preferably includes a transport gas flow forming unit configured to form a transport gas flow.

Next, specific examples of the embodiment will be described with reference to FIGS. 2 to 4.

Figure 2:
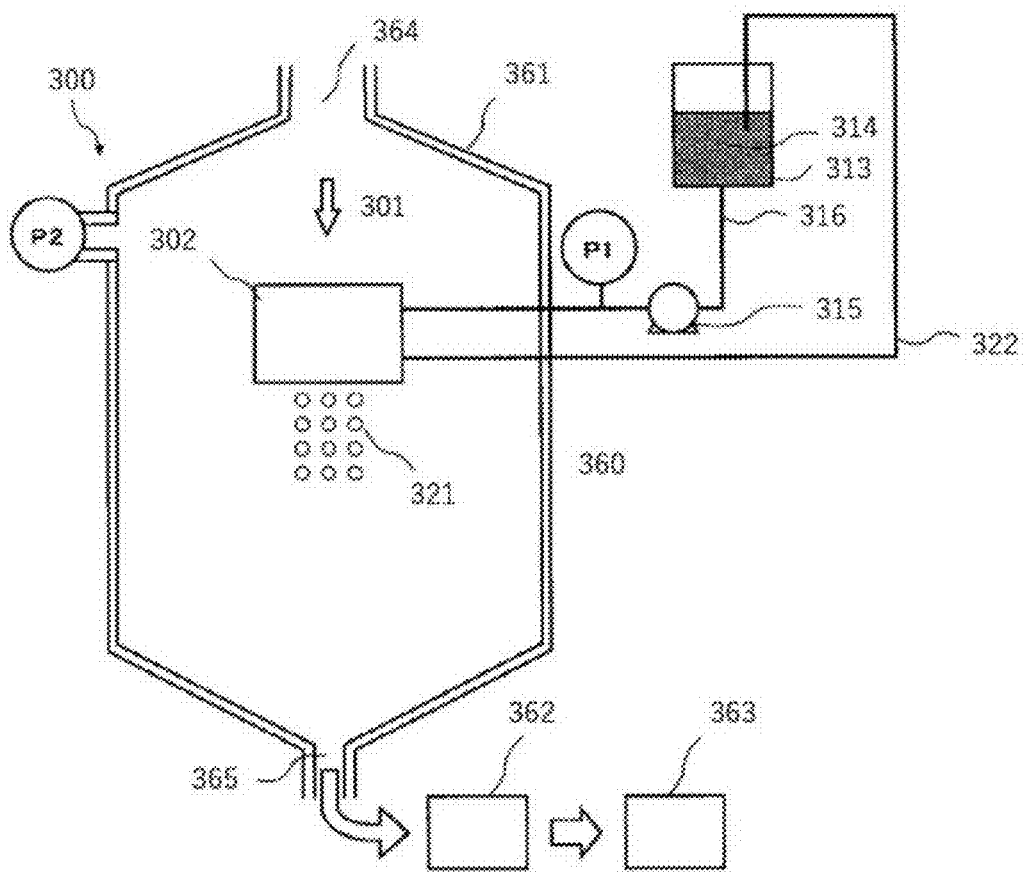
FIG. 2 is a schematic view illustrating one example of an apparatus for producing particles.

FIG. 2 is a schematic view illustrating one example of the apparatus for producing particles. FIG. 3 is a schematic cross-sectional view illustrating one example of a droplet-ejecting unit used for the apparatus for producing particles. FIG. 4 is a schematic cross-sectional view illustrating another example of the droplet-ejecting unit used for the apparatus for producing particles.

The apparatus 300 for producing particles of FIG. 2 includes a droplet-ejecting unit 302, a dry collecting unit 360, a transport gas flow outlet 365, and a particle storage unit 363. To the droplet-ejecting unit 302, a liquid storage container 313, in which a liquid 314 is stored, and a liquid circulation pump 315 are connected. The liquid-circulating pump 315 is configured to supply the liquid 314 stored in the liquid storage container 313 to the droplet-ejecting unit 302 via the liquid supply tube 316. Moreover, the liquid-circulating pump 315 is configured to pressure feed the liquid inside the liquid supply tube 316 to return to the liquid storage container 313 via a liquid returning tube 322. Therefore, the liquid 314 can be supplied to the droplet-ejecting unit 302 as needed. A pressure gauge P1 is disposed to the liquid supply tube 316 and a pressure gauge P2 is disposed to the dry collecting unit. The feeding pressure to the droplet-ejecting unit 302 is managed by the pressure gauge P1, and the internal pressure of the dry collecting unit is managed by the pressure gauge P2. When the measured pressure value of P1 is larger than the measured pressure value of P2, the liquid 314 may be bled out from the ejection hole. When the measured pressure value of P1 is smaller than the measured pressure value of P2, gas may enter the droplet-ejecting unit 302 to stop ejection of the liquid. Therefore, the measured pressure value of P1 and the measured pressure value of P2 are preferably substantially the same. A descending gas stream (transport gas flow) 301 from the transport gas flow inlet 364 is formed within a chamber 361. The droplets 321 ejected from the droplet-ejecting unit 302 is transported downwards not only by gravity but also the transport gas flow 301, passed through a transport gas flow outlet 365, collected by a particle-collecting unit 362, and stored in a particle storage unit 363.

When ejected droplets are brought into contact with each other before drying in the droplet-ejecting step, cohesion of the droplets may occur. In order to obtain particles having a narrow particle size distribution, it is desirable to keep the ejected droplets apart from one another. The ejected droplets travel at a certain initial speed, but the traveling speed eventually slows down due to air resistance. When the subsequent droplets catch up with the preceding droplets, which have slow down and are not sufficiently dried, cohesion of the droplets occurs. In order to prevent cohesion of the droplets, the droplets are preferably dried and transported by the transport gas flow 301 in a manner that the droplets are prevented from being in contact with one another to prevent cohesion of the droplets. To this end, the transport gas flow 301 is preferably arranged along the same direction to the ejection direction of the droplets adjacent to the droplet-ejecting unit 302. Even when the droplets are brought into contact with one another, cohesion does not occur if the droplets are completely dried prior to the contact. In such a case, the transport gas flow 301 may not be used.

Figure 3:
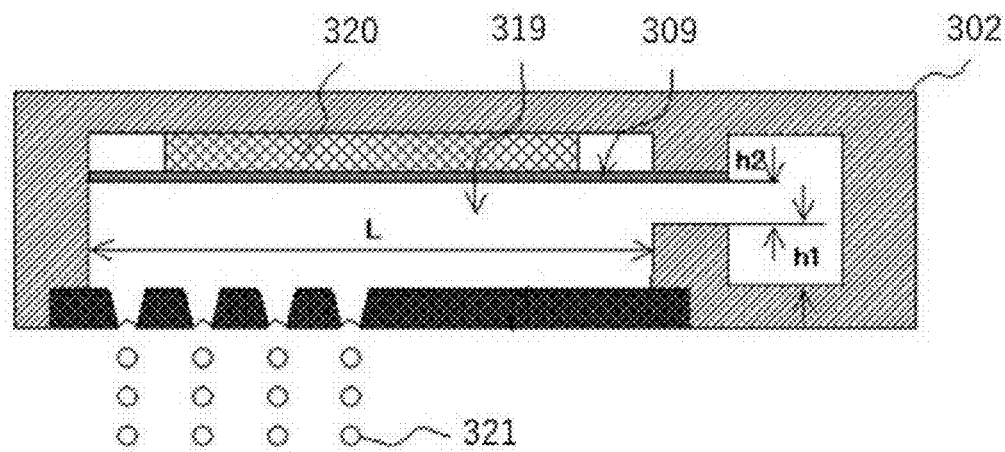
FIG. 3 is a schematic cross-sectional view illustrating one example of a droplet-ejecting unit used in the apparatus for producing particles.

FIG. 3 is an enlarged view of the droplet-ejecting unit of the apparatus for producing particles of FIG. 2. As illustrated in FIG. 3, the droplet-ejecting unit 302 includes a volume-changing unit 320, an elastic plate 309, and a liquid storage unit 319. Since the droplet-ejecting unit 302 is deformed to reduce a volume of the liquid storage unit 319 as voltage is applied to the volume-changing unit 320, the liquid stored in the liquid storage unit 319 is ejected as droplets 321 from the ejection holes.

Figure 4:
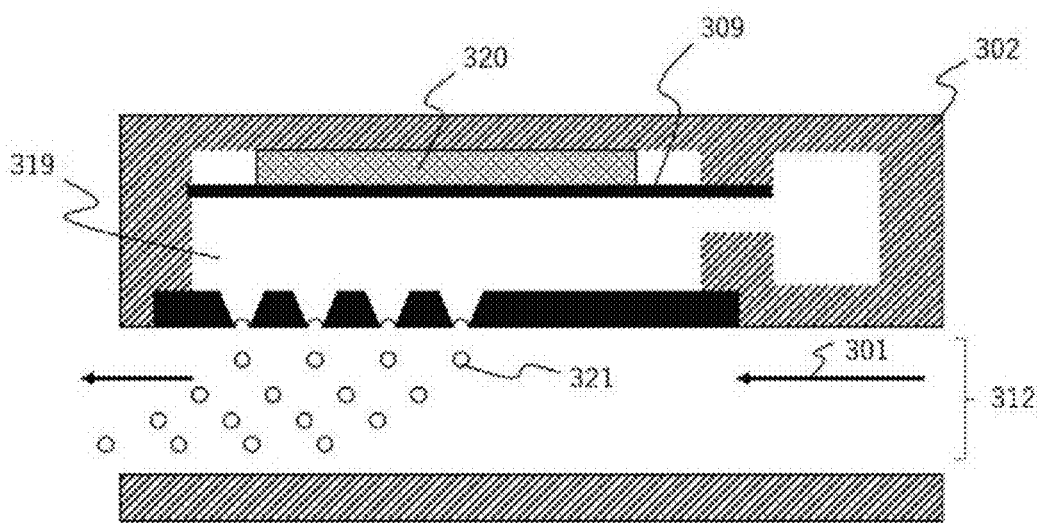
FIG. 4 is a schematic cross-sectional view illustrating another example of the droplet-ejecting unit used in the apparatus for producing particles.

FIG. 4 is a view illustrating another embodiment of the droplet-ejecting unit of the apparatus for producing particles. As illustrated in FIG. 4, the direction of the transport gas flow 301 in the gas flow path 312 may be substantially vertical to the ejection direction. The transport gas flow 301 may be set to have an angle. The transport gas flow 301 is preferably set to have an angle with which droplets travel away from the droplet-ejecting unit 302. When the droplets 321 are ejected by changing the volume of the liquid storage unit 319 by the volume-changing unit 320 via the elastic plate 309 and a transport gas flow 301 for preventing cohesion is introduced to the ejected droplets 321 from the direction substantially vertical to the direction of the ejection of the droplets, as illustrated in FIG. 4, the ejection holes are preferably arranged not to overlap trajectories of the droplets when the droplets 321 are transported from the ejection holes by the transport gas flow 301 for preventing cohesion.

After preventing cohesion of the droplets by the transport gas flow 301, the resultant particles may be transported to the particle-collecting unit by another gas flow.

The speed of the transport gas flow is preferably the same as or faster than the ejection speed of the droplets. When the speed of the transport gas flow is faster than the ejection speed of the droplet, cohesion between the droplets can be prevented.

Moreover, a chemical substance for accelerating the process for drying the droplets may be added to the transport gas flow. The state of the transport gas flow is not limited. The transport gas flow may be a laminar flow, a swirl flow, or a turbulent flow.

A type of the gas constituting the transport gas flow is not particularly limited and may be appropriately selected depending on the intended purpose. As the gas constituting the transport gas flow, air may be used, or incombustible gas, such as nitrogen, may be used.

Moreover, a temperature of the transport gas flow can be appropriately adjusted. The temperature thereof is a temperature at which the bioactivity of the physiologically active substance included in the droplets does not change.

When an amount of the residual solvent in the particles collected by the particle-collecting unit 362 of FIG. 2 is large, secondary drying is preferably performed, if necessary, in order to reduce the amount of the residual solvent. For the secondary drying, a typical drying method known in the art, such as fluidized bed drying and vacuum drying, can be used.

The preparing unit and the granulating unit are identical to the units for performing the preparing step and the granulating step, respectively, described in the descriptions of the method for producing particles of the present disclosure.

—Liquid Storage Container—

The liquid storage container is a container, in which the liquid including the base material, the physiologically active substance, and a solvent is stored.

The liquid storage container may be or may not be flexible. A material of the liquid storage container is not particularly limited and may be appropriately selected depending on the intended purpose. For example, the material thereof may be a resin or a metal. A structure of the liquid storage container is not particularly limited and may be appropriately selected depending on the intended purpose. Examples of the structure thereof include a sealed structure or a non-sealed structure.

(Physical Properties of Particles)

Examples of characteristic physical properties of the particles of the present disclosure include a bioactivity rate, a particle size distribution, and particle diameters.

—Bioactivity Rate—

In the present specification, the term "bioactivity rate" means a ratio of a value of bioactivity of particles produced with materials used in production of the particles relative to a value of bioactivity of the materials used in the production of the particles ({value of bioactivity after production of particles/value of bioactivity before production of particles}×100).

Moreover, the "value of bioactivity" means a measured value obtained by quantitatively measuring bioactivity of the physiologically active substance. The "quantitatively measuring" is not limited to a direct method for quantitatively measuring a value of bioactivity itself, and may be, for example, a relative quantitative measuring method where a value of bioactivity is measured in comparison with a predetermined standard.

The particles produced by the method for producing particles of the present disclosure preferably has a high bioactivity rate. Specifically, the bioactivity rate is preferably 40% or greater, more preferably 50% or greater, even more preferably 60% or greater, and particularly preferably 70% or greater.

Examples of elements that may affect the bioactivity rate include a bioactivity retention rate, and a physiologically active substance bioactivity.

The bioactivity retention rate represents a ratio of bioactivity of the physiologically active substance maintained over the production process of particles. Bioactivity of the physiologically active substance may change due to heating, cooling, or external stress. When a process including heating, cooling, shaking, or stirring is performed in the production process of particles, therefore, the bioactivity retention rate decreases, and as a result, the bioactivity rate also decreases.

Moreover, the physiologically active substance retention rate represents a ratio of the physiologically active substance retained in particles over the production process of particles. For example, the physiologically active substance may be lost due to decomposition or elution during the production process of particles, and as a result, a total amount of the physiologically active substance retained in the particles may be reduced. In this case, the physiologically active substance retention rate decreases, and as a result, the bioactivity rate also decreases.

Examples of a method for producing particles having a high bioactivity rate include a method where particles are produced without decreasing the bioactivity due to heating, cooling, and/or external stress, and a method where particles including a physiologically active substance the loss of which is reduced are produced.

—Particle Size Distribution—

The particles of the present disclosure preferably have a narrow particle size distribution. Specific examples of an index for representing a breadth of a particle size distribution include Relative Span Factor (R.S.F) and a ratio (Dv/Dn) of a volume average particle diameter (Dv) to a number average particle diameter (Dn). For example, R.S.F. is preferably in the range of $0<(\text{R.S.F})\leq 1.2$, and the ratio Dv/Dn is preferably 1.00 or greater but 1.50 or less. When the particle size distribution is within the above-mentioned ranges, a proportion of coarse particles relative to a targeted particle size is small. Therefore, filtration sterilization by filtration can be simply and effectively performed without clogging a sterilization filter with the particles, when the particles are added to a pharmaceutical composition and need to be sterilized by filtration before use. Since the size of the particles is homogeneous, moreover, an amount of the physiologically active substance and an amount of the base material of each particle, and a surface area of each particle are consistent. As a result, a substantially equal amount of the physiologically active substance is dissolved from each of the particles, and therefore the particles, with which sustained release of the physiologically active substance can be highly controlled, can be obtained. Since the size of the particles is homogeneous, furthermore, formation of fine particles formed only of the physiologically active substance, without including the base material, can be suppressed, and therefore sustained-release particles that can prevent initial burst can be obtained.

—Relative Span Factor (R.S.F)—

In the present disclosure, "Relative Span Factor (R.S.F)" is defined as (D90−D10)/D50. The D90 denotes a cumulative 90% by number from a small particle side of a cumulative particle size distribution, the D50 denotes a cumulative 50% by number from the small particle side of the cumulative particle size distribution, and the D10 denotes a cumulative 10% by number from the small particle side of the cumulative particle size distribution. (R.S.F) is preferably $0<(\text{R.S.F})\leq 1.2$, more preferably $0<(\text{R.S.F})\leq 1.0$, and even more preferably $0<(\text{R.S.F})\leq 0.6$. Examples of a measurement method of (R.S.F) include a measurement method using a fiber-optics particle analyzer (FPAR-1000, available from Otsuka Electronic Co., Ltd.) according to a dynamic light scattering method.

—Volume Average Particle Diameter (Dv)/Number Average Particle Diameter (Dn)—

The ratio, volume average particle diameter (Dv)/number average particle diameter (Dn), is a value obtained by dividing the volume average particle diameter (Dv) by the number average particle diameter (Dn). The ratio (Dv)/(Dn) is preferably 1.00 or greater but 1.50 or less, and more preferably 1.00 or greater but 1.20 or less. Examples of a measurement method of the volume average particle diameter (Dv), and the number average particle diameter (Dn) include measurement methods using a laser diffraction/scattering particle size distribution analyzer (device name: MICROTRAC MT3000II, available from MicrotracBEL Corp.).

—Volume Average Particle Diameter (Dv)—

When the volume average particle diameter (Dv) of the particles is 1 micrometer or greater but 100 micrometers or less, a sufficient amount of the physiologically active substance can be included, and therefore particles that can gradually release, for example, a physiologically active substance, over a long period can be produced. The volume average particle diameter (Dv) is more preferably 1 micrometer or greater but 50 micrometers or less, even more preferably 1 micrometer or greater but 30 micrometers or less, and particularly preferably 10 micrometers or greater but 30 micrometers or less.

Examples of a measurement method of the volume average particle diameter (Dv) of the particles include a measurement method using a fiber-optics particle analyzer (FPAR-1000, available from Otsuka Electronic Co., Ltd.) according to a dynamic light scattering method, and a measurement method using a laser diffraction/scattering particle size distribution analyzer (device name: MICROTRAC MT3000II, available from MicrotracBEL Corp.).

(Application of Particles)

The particles of the present disclosure can be used, for example, as a pharmaceutical composition, a functional food product, a functional cosmetic product etc., by optionally used in combination with other substances, such as a dispersant and additives. Moreover, the particles may be prepared as functional particles depending on various applications. The functional particles are not particularly limited and may be appropriately selected depending on the intended purpose. Examples thereof include immediate-release particles, sustained-release particles, pH-dependent-release particles, pH-independent-release particles, enteric-coated particles, controlled-release-coated particles, and nanocrystal-containing particles.

—Pharmaceutical Composition—

The pharmaceutical composition includes the particles of the present disclosure, and may further includes additives, such as additives for pharmaceutical preparation, according to the necessity. The additives are not particularly limited and may be appropriately selected depending on the intended purpose. Examples of the additives include an excipient, a flavoring agent, a disintegrating agent, a fluidizer, an adsorbent, a lubricant, an odor-masking agent, a surfactant, a perfume, a colorant, an anti-oxidant, a masking agent, an anti-static agent, a humectant, and a dispersion stabilizer. The above-listed examples may be used alone or in combination.

—Excipient—

The excipient is not particularly limited and may be appropriately selected depending on the intended purpose. Examples of the excipient include lactose, sucrose, mannitol, glucose, fructose, maltose, erythritol, maltitol, xylitol, palatinose, trehalose, sorbitol, microcrystalline cellulose, talc, silicic acid anhydride, anhydrous calcium phosphate, precipitated calcium carbonate, and calcium silicate. The above-listed examples may be used alone or in combination.

—Flavoring Agent—

The flavoring agent is not particularly limited and may be appropriately selected depending on the intended purpose. Examples of the flavoring agent include L-menthol, refined sugar, D-sorbitol, xylitol, citric acid, ascorbic acid, tartaric acid, malic acid, aspartame, acesulfame potassium, thaumatin, saccharin sodium, dipotassium glycyrrhizinate, sodium glutamate, sodium 5'-inosinate, and sodium 5'-guanylate. The above-listed examples may be used alone or in combination.

—Disintegrating—

The disintegrating is not particularly limited and may be appropriately selected depending on the intended purpose. Examples of the disintegrating agent include hydroxypropyl celluloses with a low substitution degree, carmellose, carmellose calcium, carboxymethyl starch sodium, croscarmellose sodium, crospovidone, hydroxypropyl starch, and corn starch. The above-listed examples may be used alone or in combination.

—Fluidizer—

The fluidizer is not particularly limited and may be appropriately selected depending on the intended purpose. Examples of the fluidizer include light anhydrous silicic acid, hydrated silicon dioxide, and talc. The above-listed examples may be used alone or in combination.

As the light anhydrous silicic acid, a commercial product can be used. The commercial product thereof is not particularly limited and may be appropriately selected depending on the intended purpose. Examples of the commercial product thereof include ADSOLIDER 101 (available from Freund Corporation, average pore diameter: 21 nm).

—Adsorbent—

As the adsorbent, a commercial product can be used. The commercial product of the adsorbent is not particularly limited and may be appropriately selected depending on the intended purpose. Examples thereof include product name: CARPLEX (component name: synthetic silica, registered trademark of DSL. Japan Co., Ltd.), product name: AEROSIL (registered trademark of NIPPON AEROSIL CO., LTD.) 200 (component name: hydrophilic fumed silica), product name: SYLYSIA (component name: amorphous silicon dioxide, registered trademark of Fuji Silysia Chemical Ltd), and product name: ALCAMAC (component name: synthetic hydrotalcite, registered trademark of Kyowa Chemical Industry Co., Ltd.). The above-listed examples may be used alone or in combination.

—Lubricant—

The lubricant is not particularly limited and may be appropriately selected depending on the intended purpose. Examples of the lubricant include magnesium stearate, calcium stearate, sucrose fatty acid ester, sodium stearyl fumarate, stearic acid, polyethylene glycol, and talc. The above-listed examples may be used alone or in combination.

—Odor-Masking Agent—

The odor-masking agent is not particularly limited and may be appropriately selected depending on the intended purpose. Examples of the odor-masking agent include trehalose, malic acid, maltose, potassium gluconate, aniseed essential oil, vanilla essential oil, and cardamom oil. The above-listed examples may be used alone or in combination.

—Surfactant—

The surfactant is not particularly limited and may be appropriately selected depending on the intended purpose. Examples of the surfactant include benzalkonium chloride, lecithin, sorbitan fatty acid ester, polyoxyethylene hydrogenated castor oil, polyoxyethylene polyoxypropylene glycol, polyoxyethylene orbitan monooleate, polyvinyl alcohol, sorbitan monooleate, glycerin monostearate, sorbitan sesquioleate, sorbitan monostearate, glyceryl monostearate, polyglycerol fatty acid ester, polysorbate (e.g., polysorbate 80), a polyoxyethylene-polyoxypropylene copolymer, and sodium lauryl sulfate. As an index of the surfactant, there is hydrophilic-lipophilic balance. In the present disclosure, the hydrophilic-lipophilic balance is preferably 1 or greater but 8 or less, and more preferably 3 or greater but 6 or less. Among the above-listed examples, sorbitan sesquioleate (hydrophilic-lipophilic balance: 4) is particularly preferable. The above-listed examples may be used alone or in combination.

—Perfume—

The perfume is not particularly limited and may be appropriately selected depending on the intended purpose. Examples of the perfume include lemon oil, orange oil, and peppermint oil. The above-listed examples may be used alone or in combination.

—Colorant—

The colorant is not particularly limited and may be appropriately selected depending on the intended purpose. Examples of the colorant include titanium oxide, Food Yellow No. 5, Food Blue No. 2, iron sesquioxide, and yellow iron sesquioxide. The above-listed examples may be used alone or in combination.

—Anti-Oxidant—

The anti-oxidant is not particularly limited and may be appropriately selected depending on the intended purpose. Examples of the anti-oxidant include sodium ascorbate, L-cysteine, sodium sulfite, and vitamin E. The above-listed examples may be used alone or in combination.

—Masking Agent—

The masking agent is not particularly limited and may be appropriately selected depending on the intended purpose. Examples of the masking agent include titanium oxide. The above-listed examples may be used alone or in combination.

—Anti-Static Agent—

The anti-static agent is not particularly limited and may be appropriately selected depending on the intended purpose. Examples of the anti-static agent include talc and titanium oxide. The above-listed examples may be used alone or in combination.

—Humectant—

The humectant is not particularly limited and may be appropriately selected depending on the intended purpose. Examples of the humectant include polysorbate 80, sodium lauryl sulfate, sucrose fatty acid ester, macrogol, and hydroxypropyl cellulose (HPC). The above-listed examples may be used alone or in combination.

A pharmaceutical preparation of the pharmaceutical composition is not particularly limited and may be appropriately selected depending on the intended purpose. Examples thereof include colon delivery preparations, lipid microsphere preparations, dry emulsion preparations, self-emulsifying preparations, dry syrup, powder preparations for transnasal administration, powder preparations for pulmonary administration, wax matrix preparations, hydrogel preparations, polymeric micelle preparations, mucoadhesive preparations, gastric floating preparations, liposome preparations, and solid dispersion preparations. The above-listed examples may be used alone or in combination.

—Dispersion Stabilizer—

The dispersion stabilizer is not particularly limited and may be appropriately selected depending on the intended purpose. Examples thereof include polyvinyl alcohol, polyvinyl pyrrolidone, sodium alginate, a carboxyvinyl polymer, crystalline cellulose, carmellose sodium, guar gum, xanthan gum, dextrin, pectin, and fatty acid (e.g., stearic acid). The above-listed examples may be used alone or in combination.

Examples of the dosage form of the pharmaceutical composition include: tablets, capsules, suppository, and other solid dosage forms; intranasal aerosol and aerosol for pulmonary administration; and liquid medicaments, such as injections, intraocular preparations, endaural preparations, and oral preparations.

The administration route of the pharmaceutical composition is not particularly limited and may be appropriately selected depending on the intended purpose. Examples thereof include oral administration, nasal administration, rectal administration, vaginal administration, subcutaneous administration, intravenous administration, and pulmonary administration. Among the above-listed examples, oral administration is preferable.

EXAMPLES

The present disclosure will be described below by way of Examples. The present disclosure should not be construed as being limited to these Examples.

Example 1

—Preparation of Dispersion Liquid 1—

As a physiologically active substance, rabbit IgG antibodies (available from Merck) were added to pure water serving as Solvent A, to thereby prepare Liquid A1. The amount of the physiologically active substance was adjusted to be 1.2 mg/mL relative to a total amount of Liquid A1.

Moreover, polylactic-co-glycolic acid (PLGA5050, available from FUJI FILM Wako Pure Chemical Corporation) serving as a base material, and sorbitan sesquioleate (SPAN83, available from Tokyo Chemical Industry Co., Ltd.) serving as a surfactant were added to dichloromethane (available from FUJI FILM Wako Pure Chemical Corporation) serving as Solvent B, to thereby prepare Liquid B1. The amount of the polylactic-co-glycolic acid was adjusted to 12.0 mg/mL, and the amount of the sorbitan sesquioleate was adjusted to 0.5% by volume, relative to a total amount of Liquid B1.

Next, Liquid A1 and Liquid B1 were mixed at a mass ratio (Liquid A1:Liquid B1) of 1:9, and the mixed solution was homogenized by a homogenizer (device name: sonicstar 85, available from AS ONE Corporation) for 10 minutes at output of 90%, to thereby prepare Dispersion Liquid 1 (W/O emulsion).

—Granulation of Particles 1 (Liquid Column Resonance)—

Dispersion Liquid 1 obtained was ejected from the droplet-ejecting unit to form droplets, and the solvent was removed from the droplets, to thereby granulate Particles 1. The droplet-ejecting unit was the droplet-ejecting unit illustrated in FIG. 4, where the number of ejection holes was one per a liquid column resonance chamber, disposed in the apparatus for producing particles of FIG. 2.

Particles 1 obtained had the volume average particle diameter (Dv) of 2.63 micrometers, the number average particle diameter (Dn) of 2.26 micrometers, and the particle size distribution (Dv/Dn) of 1.16. Note that, Dv, Dn, and Dv/Dn were measured by means of a laser diffraction/scattering particle size distribution analyzer (device name: MICROTRAC MT3000II, available from MicrotracBEL Corp.). The volume average particle diameter, the number average particle diameter, and the particle size distribution were measured in the same manner hereinafter. The measuring and analyzing conditions and production conditions of particles were as follows.
(Measuring Conditions of Particle Size Distribution)
   Measuring mode: transmission mode
   Refractive index of particles: 1.40
   Set zero time: 10 seconds
   Measuring time: 10 seconds
(Production Conditions of Particles)
   Shape of ejection hole: true circle
   Diameter of ejection hole: 8 micrometers
   Dry gas flow rate (dry nitrogen): 50 L/min Example 2

—Granulation of Particles 2 (Rayleigh Breakup)—
Particles 2 were granulated in the same manner as in Example 1, except that the droplet-ejecting unit for use was changed to the Rayleigh breakup droplet-ejecting unit disclosed in Japanese Patent No. 4647506.
Particles 2 obtained had the volume average particle diameter (Dv) of 18.22 micrometers, the number average particle diameter (Dn) of 14.81 micrometers, and the particle size distribution (Dv/Dn) of 1.23. The production conditions of the particles were as follows.
(Production Conditions of Particles)
   Shape of ejection hole: true circle
   Diameter of ejection hole: 30 micrometers
   Extrusion pressure of dispersion liquid: 0.15 MPa Example 3

—Granulation of Particles 3 (Spray Drying)—
Particles 3 were granulated in the same manner as in Example 1, except that a particle production device according to spray drying (device name: spray drier for organic solvent, product number: GS310, 4-fluid nozzle, available from Fujisaki Electric Co., Ltd.).
Particles 3 obtained had the volume average particle diameter (Dv) of 2.87 micrometers, the number average particle diameter (Dn) of 1.95 micrometers, and the particle size distribution (Dv/Dn) of 1.47. The spray dry conditions were as follows.
(Spray Dry Conditions)
   Feeding rate of Dispersion Liquid 1 to nozzle: 10 mL/min
   Dry gas flow rate (dry nitrogen): 30 U/min
   Orifice pressure: 1.3 kPa
   Temperature (Inlet): 50 degrees Celsius
   Temperature (Outlet): 40 degrees Celsius Example 4

Particles 4 were produced in the same manner as in Example 1, except that the physiologically active substance was changed from the rabbit IgG antibodies to albumin (product name: albumin from Bovine serum, manufacturer: FUJI FILM Wako Pure Chemical Corporation).
Particles 4 obtained had the volume average particle diameter (Dv) of 2.86 micrometers, the number average particle diameter (Dn) of 2.45 micrometers, and the particle size distribution (Dv/Dn) of 1.17.

Comparative Example 1

—Preparation of Liquid C1—
Rabbit IgG antibodies (available from Merck) serving as a physiologically active substance, and polylactic-co-glycolic acid (PLGA5050, available from FUJI FILM Wako Pure Chemical Corporation) serving as a base material were added to 20 mL of hexafluoro-2-propanol (1,1,1,3,3,3-hexafluoro-2-propanol, HFIP, available from FUJI FILM Wako Pure Chemical Corporation), to thereby prepare Liquid C1. The amount of the physiologically active substance was adjusted to 1.2 mg/mL, and the amount of the polylactic-co-glycolic acid was adjusted to 12.0 mg/mL, relative to a total amount of Liquid C1.
—Granulation of Particles 5 (Liquid Column Resonance)—
Particles 5 were granulated in the same manner as in Example 1, except that Dispersion Liquid 1 was replaced with Liquid C1.
Particles 5 obtained had the volume average particle diameter (Dv) of 3.07 micrometers, the number average particle diameter (Dn) of 2.677 micrometers, and the particle size distribution (Dv/Dn) of 1.15.

Comparative Example 2

Particles 6 were granulated in the same manner as in Example 2, except that Dispersion Liquid 1 was replaced with Liquid C1.
Particles 6 obtained had the volume average particle diameter (Dv) of 17.58 micrometers, the number average particle diameter (Dn) of 14.19 micrometers, and the particle size distribution (Dv/Dn) of 1.24.

Comparative Example 3

Particles 7 were granulated in the same manner as in Example 3, except that Dispersion Liquid 1 was replaced with Liquid C1.
Particles 7 obtained had the volume average particle diameter (Dv) of 3.32 micrometers, the number average particle diameter (Dn) of 2.49 micrometers, and the particle size distribution (Dv/Dn) of 1.33.

Comparative Example 4

—Preparation of Dispersion Liquid 2—
Rabbit IgG antibodies (available from Merck) serving a physiologically active substance were added to 1.0 mL of pure water serving as Solvent A, to thereby prepare Liquid A2. The amount of the physiologically active substance was adjusted to 1.2 mg/mL, relative to a total amount of Liquid A2.
Moreover, polylactic-co-glycolic acid (PLGA5050, available from FUJI FILM Wako Pure Chemical Corporation) serving as a base material was added to 5.0 mL of dichloromethane (available from FUJI FILM Wako Pure Chemical Corporation) serving as Solvent B, to thereby prepare Liquid B2. The amount of the polylacticco-glycolic acid was adjusted to 30.0 mg/mL, relative to a total amount of Liquid B2.
Next, Liquid A2 and Liquid B2 were mixed at a mass ratio (Liquid A2:Liquid B2) of 1:5, and the mixed solution was homogenized by a homogenizer (device name: Polytron, available from KINEMATICA) for 10 minutes at output of 90%, to thereby prepare Dispersion Liquid 2 (W/O emulsion).
—Granulation of Particles 8 (Liquid Drying)—
Next, 10 mL of Dispersion Liquid 2 prepared was added to and mixed with 100 mL of a 0.4% PVA aqueous solution, to thereby obtain a W/O/W emulsion. Thereafter, the obtained emulsion was stirred by a magnetic stirrer at a stirring rate of 300 rpm to dry the dichloromethane. After confirming generation of solid particles by visual observation, the particles were freeze-dried to granulate Particles 8.

Particles 8 obtained had the volume average particle diameter (Dv) of 14.53 micrometers, the number average particle diameter (Dn) of 12.02 micrometers, and the particle size distribution (Dv/Dn) of 1.21.

Comparative Example 5

—Preparation of Dispersion Liquid 3—

Rabbit IgG antibodies (available from Merck) serving as a physiologically active substance, and Poloxamer 407 (Pluronic F-127, available from Sigma-Aldrich) serving as a surfactant were added to pure water serving as Solvent A, to thereby prepare Liquid A3. The amount of the physiologically active substance was adjusted to 1.2 mg/mL, and the amount of Poloxamer 407 was adjusted to 0.5% by volume, relative to a total amount of Liquid A3.

Moreover, polylactic-co-glycolic acid (PLGA5050, available from FUJI FILM Wako Pure Chemical Corporation) serving as a base material was added to dichloromethane (available from FUJI FILM Wako Pure Chemical Corporation) serving as Solvent B, to thereby prepare Liquid B3. The amount of the polylactic-co-glycolic acid was adjusted to 12.0 mg/mL, relative to a total amount of Liquid B3.

Next, Liquid A3 and Liquid B3 were mixed at a mass ratio (Liquid A3:Liquid B3) of 1:9, and the mixed solution was homogenized by a homogenizer (device name: sonicstar 85, available from AS ONE Corporation) for 10 minutes at output of 90%, to thereby prepare Dispersion Liquid 3 (W/O emulsion).

—Granulation of Particles 9 (Liquid Column Resonance)—

Particles 9 were granulated in the same manner as in Example 1, except that Dispersion Liquid 1 was replaced with Dispersion Liquid 3.

Particles 9 obtained had the volume average particle diameter (Dv) of 2.78 micrometers, the number average particle diameter (Dn) of 2.31 micrometers, and the particle size distribution (Dv/Dn) of 1.20.

Next, Particles 1 to 9 obtained in Examples 1 to 4 and Comparative Examples 1 to 5 were subjected to a "dissolution test" as described below, and "inclusion rate (%) of physiologically active substance," "dissolution rate (%) of physiologically active substance over time," and "activity rate (%) of physiologically active substance" were measured and evaluated. The results are presented in Table 2.

(Dissolution Test)

The dissolution test was performed in the following manner. Into a 1.5 mL microtube, 3 mg of each particles (each of Particles 1 to 9) and 1 mL of water were added. Then, centrifugal separation (5,000 rpm) was performed for 10 minutes, and 500 microliters of the supernatant liquid was collected as Day-0 liquid. As a centrifuge, Microfuge 16, available from Beckman Coulter was used.

Next, 500 microliters of water was added to the microtube to which the above-described process was performed, and the resultant was continuously shaken for 1 day, and 2 days at 100 rpm by means of a shaker (digital shaker, available from FRONT LAB). After shaking for 1 day, and 2 days, solutions were collected as Day-1 liquid, and Day-2 liquid, respectively.

<Measurement of Inclusion Rate (%) of Physiologically Active Substance (IgG)>

The produced particles (1.0 mg) were added to 1.0 mL of a sodium hydroxide aqueous solution prepared to be 0.1 mol, and the resultant was left to stand for 1 day to completely dissolve the particles. Using the resultant solution, the inclusion rate (%) of IgG in the particles was measured in accordance with the BCA assay with a BCA assay kit (micro-BCA, catalog No. KY-2020, available from integrale Co., Ltd.). The measuring method was carried out as described in the product manual of the kit. The inclusion rate (%) was calculated by the following formula. The results are presented in Tables 1-1 and 1-2.

Inclusion rate=(amount of IgG present in particles/charged amount of IgG)×100(%)

<Measurement of Dissolution Rate (%) of Physiologically Active Substance (IgG) Over Time>

The dissolution amount of the physiologically active substance over time was measured using Day-0 liquid, Day-1 liquid, and Day-2 liquid obtained in the dissolution test.

The dissolution rate over time was calculated by the following formula.

Dissolution rate (%)=(amount of IgG in the solution of each day/amount of IgG present in particles)×100(%)

<Measurement of Activity Rate (%) of Physiologically Active Substance>

It is important that IgG is protein having a molecular weight of about 15 kDa and has a structure that exhibits a function. Since there was a possibility that the structure may be lost during a change over time during the dissolution test as a result of contact with an organic solvent or a surfactant, or drying, ELISA was used as a method for recognizing and detecting the structure of IgG.

<<Procedure>>

The following buffer was produced.

Solid-phase buffer: $NaHCO_3/Na_2CO_3$, 0.1 M/0.1 M, pH 9.6

Wash buffer: 0.05% of Tween 20 was dissolved in PBS(−)

Blocking buffer: 0.05% of Tween 20 and 5% of BSA were dissolved PBS(−).

—First Day—

Anti-rabbit goat IgG (available from Merck) was diluted with the solid-phase buffer to 10 μg/mL, and the resultant was placed in each well and then was left to stand overnight in a refrigerator.

—Second Day—

Each well was washed 3 times with 200 microliters of the wash buffer.

The blocking buffer in an amount of 50 microliters was placed in each well and was left to stand for 1 hours.

Each well was washed 3 times with 200 microliters of the wash buffer.

The measurement sample and a serial dilution were placed, and the resultant was left to stand for 1 hour.

Each well washed 3 times with 200 microliters of the wash buffer.

Fifty microliters of HRP-anti rabbit antibodies (available from Merck) prepared to be 300 ng/mL was placed in each well and then was left to stand for 1 hour.

Each well washed 3 times with 200 microliters of the wash buffer.

A chromogenic substrate in aqueous hydrogen peroxide was added.

A Color developing process was monitored with a wavelength of 652 nm, and a $H_2SO_4$ solution serving as a reaction terminator was added at appropriate timing. Absorbance with 450 nm was measured.

The results are presented in Tables 1-1 and 1-2 below. The numerical values of the activity represent antibody activity rates of the particles in Day-O liquid, Day-1 liquid, and Day-2 liquid, respectively, when the activity level of the amount of the antibodies included in the particles used in the dissolution test is measured in the activity test (positive control), and is determined as 100%.

TABLE 1-1

| | | Liquid A | | | Liquid B | | |
|---|---|---|---|---|---|---|---|
| | | Physiologically active substance | Solvent A | Other | Base material | Surfactant | Solvent B |
| Example | 1 | rabbit IgG antibodies | water | — | PLGA | sorbitan sesquioleate | dichloromethane |
| | 2 | rabbit IgG antibodies | water | — | PLGA | sorbitan sesquioleate | dichloromethane |
| | 3 | rabbit IgG antibodies | water | — | PLGA | sorbitan sesquioleate | dichloromethane |
| | 4 | Bovine serum albumin | water | — | PLGA | sorbitan sesquioleate | dichloromethane |
| Comparative Example | 1 | rabbit IgG antibodies | HFIP | — | PLGA | — | dichloromethane |
| | 2 | rabbit IgG antibodies | HFIP | — | PLGA | — | dichloromethane |
| | 3 | rabbit IgG antibodies | HFIP | — | PLGA | — | dichloromethane |
| | 4 | rabbit IgG antibodies | water | — | PLGA | — | dichloromethane |
| | 5 | rabbit IgG antibodies | water | Poloxamer 407 | PLGA | — | dichloromethane |

TABLE 1-2

| | | Previous state of particles | Granulation method | Particles | | | |
|---|---|---|---|---|---|---|---|
| | | | | No. | Dv (μm) | Dn (μm) | Dv/Dn |
| Example | 1 | dispersion liquid | liquid column respnance | 1 | 2.63 | 2.26 | 1.16 |
| | 2 | dispersion liquid | Rayleigh breakup | 2 | 18.22 | 14.81 | 1.23 |
| | 3 | dispersion liquid | spray drying | 3 | 2.87 | 1.95 | 1.47 |
| | 4 | dispersion liquid | liquid column respnance | 4 | 2.86 | 2.45 | 1.17 |
| Comparative Example | 1 | solution | liquid column respnance | 5 | 3.07 | 2.68 | 1.15 |
| | 2 | solution | Rayleigh breakup | 6 | 17.58 | 14.19 | 1.24 |
| | 3 | solution | spray drying | 7 | 3.32 | 2.49 | 1.33 |
| | 4 | dispersion liquid | liquid drying | 8 | 14.53 | 12.02 | 1.21 |
| | 5 | dispersion Equid | liquid column respnance | 9 | 2.78 | 2.31 | 1.20 |

TABLE 2

| | | Evaluation results | | | | | | |
|---|---|---|---|---|---|---|---|---|
| | | Inclusion rate (%) | Dissolution rate (%) | | | Activity rate (%) | | |
| | | | Day 0 | Day 1 | Day 2 | Day 0 | Day 1 | Day 2 |
| Example | 1 | 99 | 3.31 | 3.52 | 6.02 | 2.87 | 2.11 | 5.61 |
| | 2 | 100 | 3.68 | 4.84 | 5.84 | 2.49 | 1.76 | 4.47 |
| | 3 | 99 | 5.15 | 6.67 | 13.99 | 2.36 | 3.49 | 7.48 |
| | 4 | 98 | 4.29 | 8.62 | 13.22 | — | — | — |
| Comparative Example | 1 | 100 | 18.64 | 25.63 | 33.95 | 0 | 0 | 0 |
| | 2 | 100 | 15.48 | 20.75 | 27.59 | 0 | 0 | 0 |
| | 3 | 99 | 21,.82 | 24.31 | 35.73 | 0 | 0 | 0 |
| | 4 | 3 | 16.12 | 17.98 | 20.35 | 10.8 | 5.43 | 6.88 |
| | 5 | 97 | 10.54 | 14.22 | 23.75 | 8.39 | 12.55 | 17.83 |

As presented in Tables 1 and 2, it was found that, in the present disclosure, the inclusion rate of the antibodies was almost 100% and did not change regardless of the method for ejecting the droplets followed by drying, i.e., liquid column resonance, Rayleigh breakup, and spray drying, and the activity of the antibodies could be maintained by using the dispersion liquid. Moreover, it was also found that, in the present disclosure, the function of gradually releasing the antibodies could be imparted by using PLGA, which was a lipid-soluble sustained-release base material. Since the inclusion rate of the present disclosure was high compared to the liquid-drying method, the production method of the present disclosure had less drug loss, and was excellent.

The significantly large activity rate (%) of Comparative Example 4 compared with Examples suggested that a large amount of the physiologically active substance (antibodies) was dissolved from the particles from Day 0 and the antibodies could not be gradually released because the inclusion rate (%) was low and the dissolution rate (%) was high.

For example, embodiments of the present disclosure are as follows.

<1> A method for producing particles, the method including:

preparing a dispersion liquid with Liquid A and Liquid B, where Liquid A is a solution containing a physiologically active substance, and Liquid B is a solution containing a base material and a surfactant; and forming particles from the dispersion liquid.

<2> The method according to <1>, wherein the dispersion liquid is a W/O emulsion.

<3> The method according to <1> or <2>, wherein a hydrophilic-lipophilic balance of the surfactant is 1 or greater but 8 or less.

<4> The method according to <3>, wherein the hydrophilic-lipophilic balance of the surfactant is 3 or greater but 6 or less.

<5> The method according to any one of <1> to <4>, wherein the surfactant is sorbitan sesquioleate.

<6> The method according to any one of <1> to <5>, wherein the particles are sustained-release particles.

<7> The method according to any one of <1> to <6>, wherein the base material includes a biodegradable resin.

<8> The method according to <7>, wherein the biodegradable resin includes at least one selected from the group consisting of polylactic acid, and a polylactic acid-glycolic acid copolymer.

<9> The method according to any one of <1> to <8>, wherein the physiologically active substance is a biopolymer compound.

<10> The method according to <9>, wherein the biopolymer compound is an antibody.

<11> An apparatus for producing particles, including:

a preparing unit configured to prepare a dispersion liquid with Liquid A and Liquid B, where Liquid A is a solution containing a physiologically active substance, and Liquid B is a solution containing a base material and a surfactant; and a granulating unit configured to eject the dispersion liquid into a gas to form particles.

The method for producing particles according to any one of <1> to <10> and the apparatus for producing particles according to <11> can solve the above-described various problems existing in the art and can achieve the object of the present disclosure.

REFERENCE SIGNS LIST 21, 321: droplets

The invention claimed is:

1. A method for producing particles, the method comprising:

preparing a dispersion liquid with Liquid A and Liquid B, where Liquid A is a solution comprising a physiologically active substance, and Liquid B is a solution comprising a base material and a surfactant; and forming particles from the dispersion liquid, wherein the surfactant comprises sorbitan sesquioleate, the base material comprises a biodegradable resin which comprises at least one resin selected from the group consisting of polylactic acid and a polylactic acid-glycolic acid copolymer, the physiologically active substance is an antibody, and the particles are sustained-release particles.

2. The method according to claim 1, wherein the dispersion liquid is a W/O emulsion.

3. The method according to claim 1, wherein a hydrophilic-lipophilic balance of the surfactant is 1 or greater but 8 or less.

4. The method according to claim 3, wherein the hydrophilic-lipophilic balance of the surfactant is 3 or greater but 6 or less.

* * * * *